INVENTOR
ROBERT F. A. LEM
BY Norbert Ederer
HIS ATTORNEY

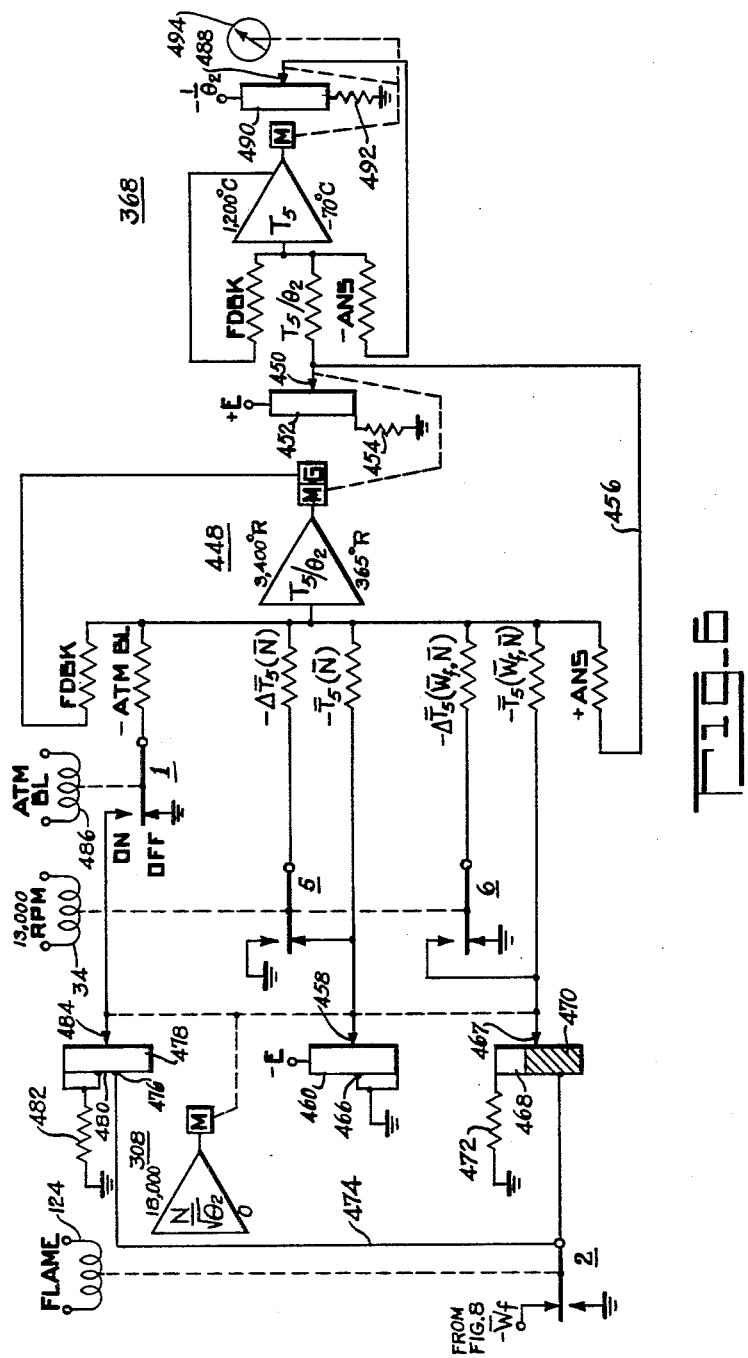

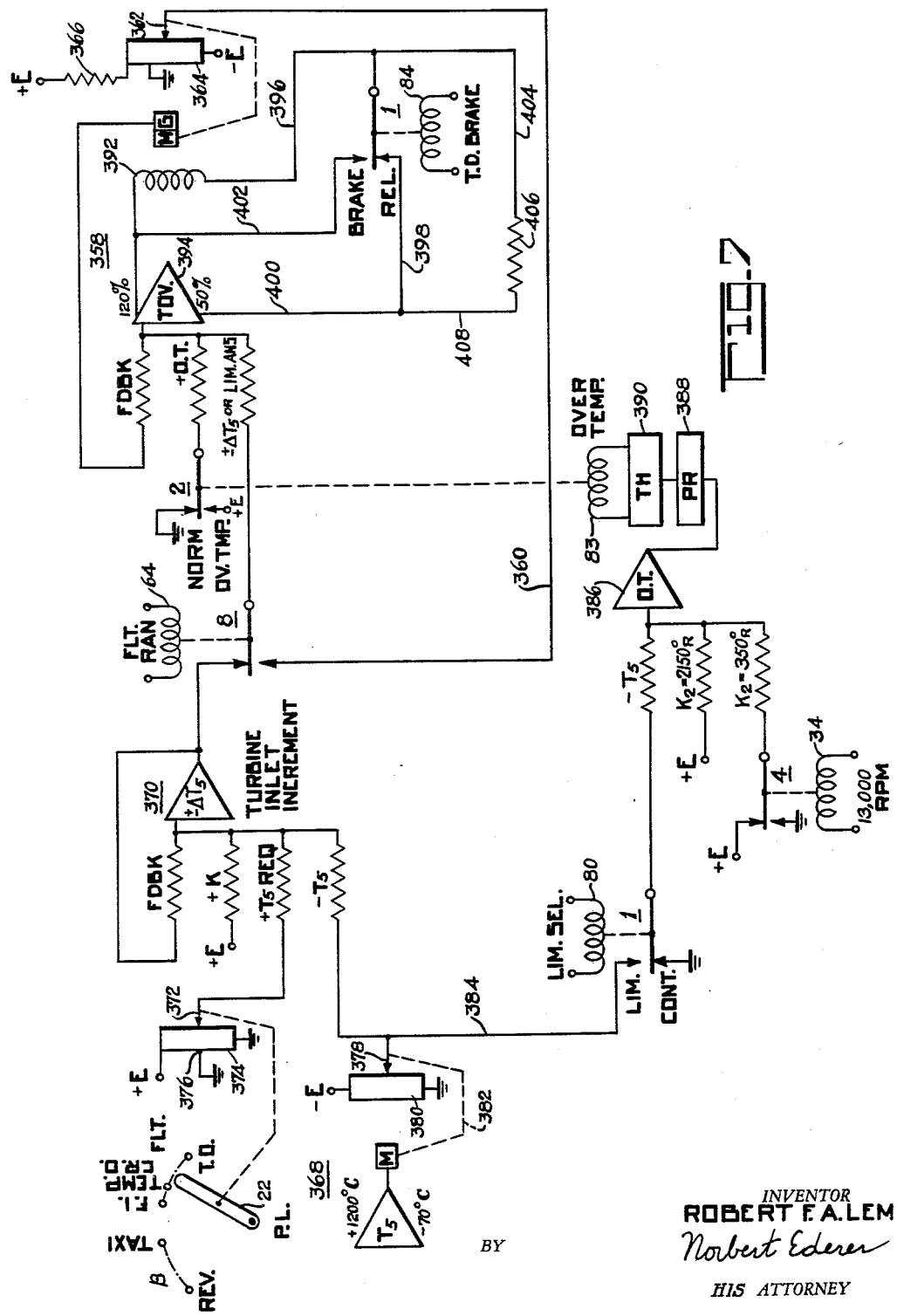

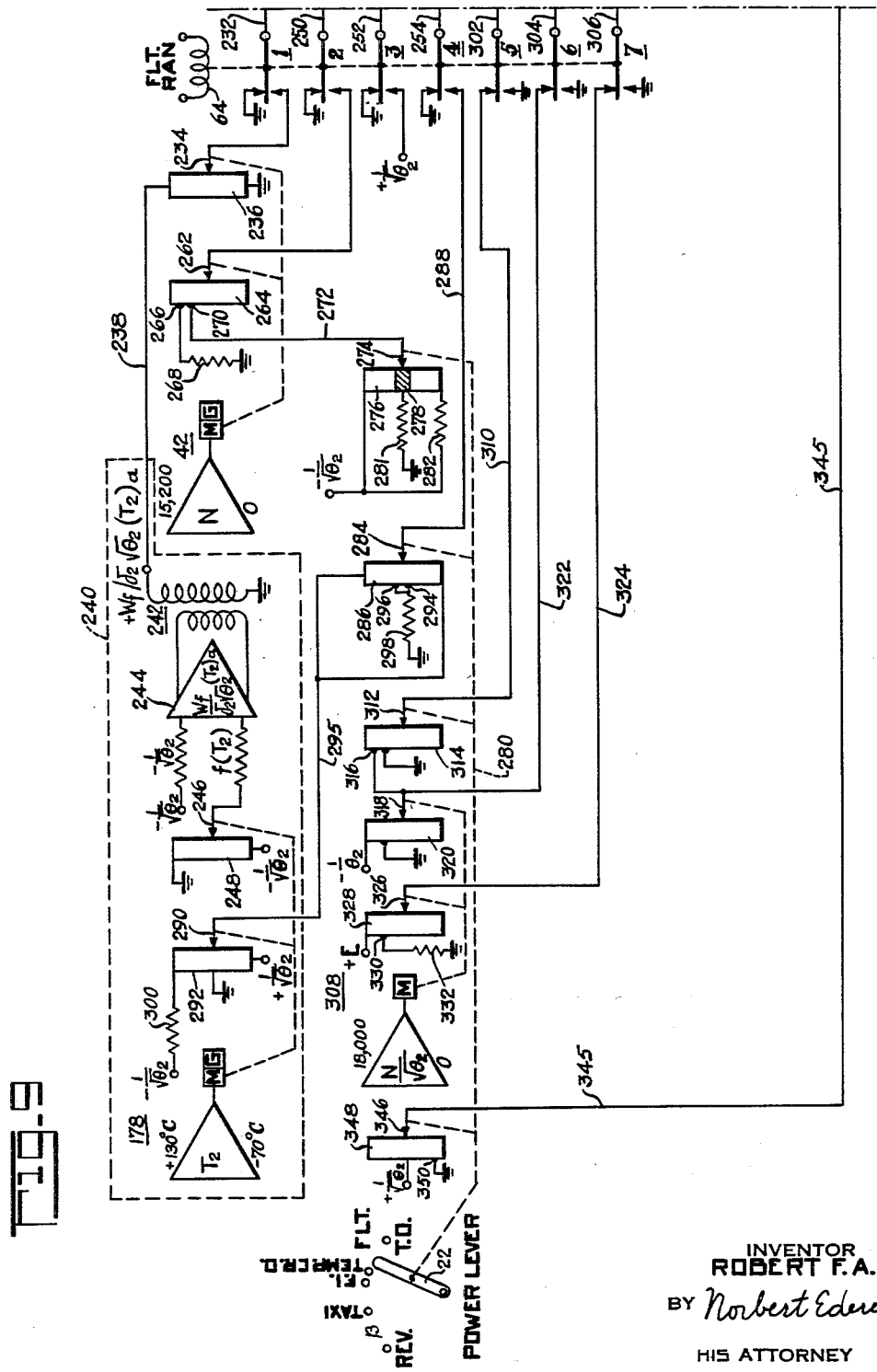

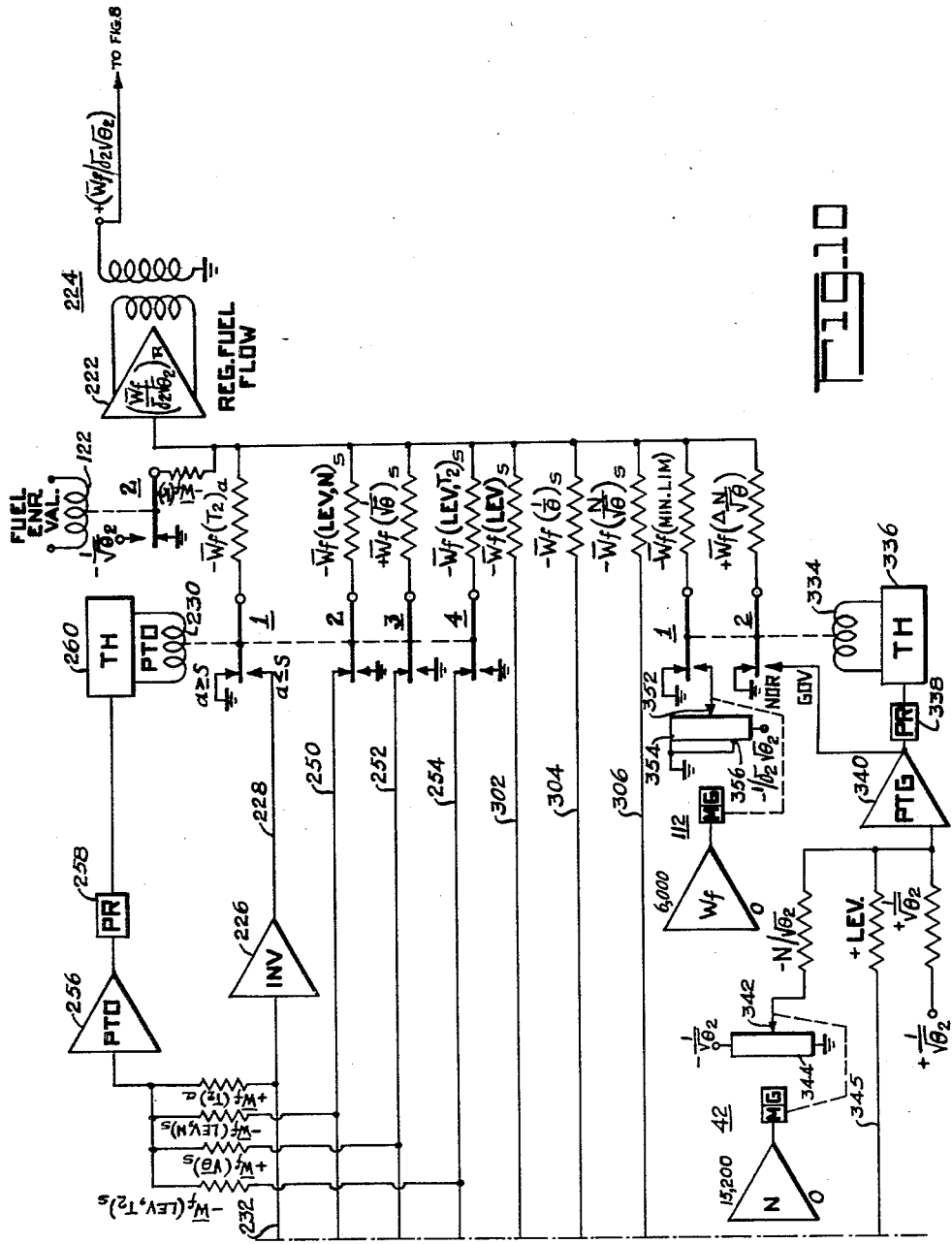

United States Patent Office 2,940,181
Patented June 14, 1960

2,940,181

AIRCRAFT TRAINING APPARATUS FOR SIMULATING THE TURBINE SYSTEM OF TURBO-PROPELLER AIRCRAFT

Robert F. A. Lem, Canoga Park, Calif., assignor to Curtiss-Wright Corporation, a corporation of Delaware Filed Dec. 3, 1957, Ser. No. 700,407

12 Claims. (Cl. 35—12)

This invention relates to ground apparatus for training aircraft personnel, and in particular to apparatus for simulating the operation and control of the engines of so-called turbo-prop aircraft.

Simulation of the operation of reciprocating piston engines is disclosed by the prior art, for example in a pending application of W. H. Dawson et al., S.N. 596,030, filed July 6, 1956, and assigned to the assignee of the present invention. The simulation of the operation of turbo-jet engine operation is also disclosed by the prior art, an example being U.S. Patent No. 2,798,308, granted July 9, 1957, to Robert G. Stern. The simulation however of gas turbine (turbo-prop) systems for purposes of flight training has not heretofore to the best of my knowledge been satisfactorily accomplished. This simulation involves unique and quite different problems due to the radical differences between the high speed gas turbine and the reciprocating engine with relation to a constant speed variable pitch propeller. These differences involve the operating characteristics of the gas turbine and practical considerations such as the comparatively high inertia of the turbine assembly rotating at very high speed.

A principal object therefore of the invention is new simulating apparatus that is efficient and realistic in representing various phases of operation and control of a gas turbine engine system, and that is valuable in the ground training of aircraft personnel.

The invention will be more fully set forth in the following description referring to the accompanying drawings, and the features of novelty will be pointed out with particularity in the claims annexed to and forming a part of this specification.

In the drawings:

Fig. 6 is a schematic drawing of a turbine inlet temperature ($T_5$) computing system;

Fig. 7 is a schematic drawing of a temperature datum valve (TDV) computing system;

Fig. 8 is a schematic drawing of a fuel flow ($W_f$) computing system, and

Figure 1:
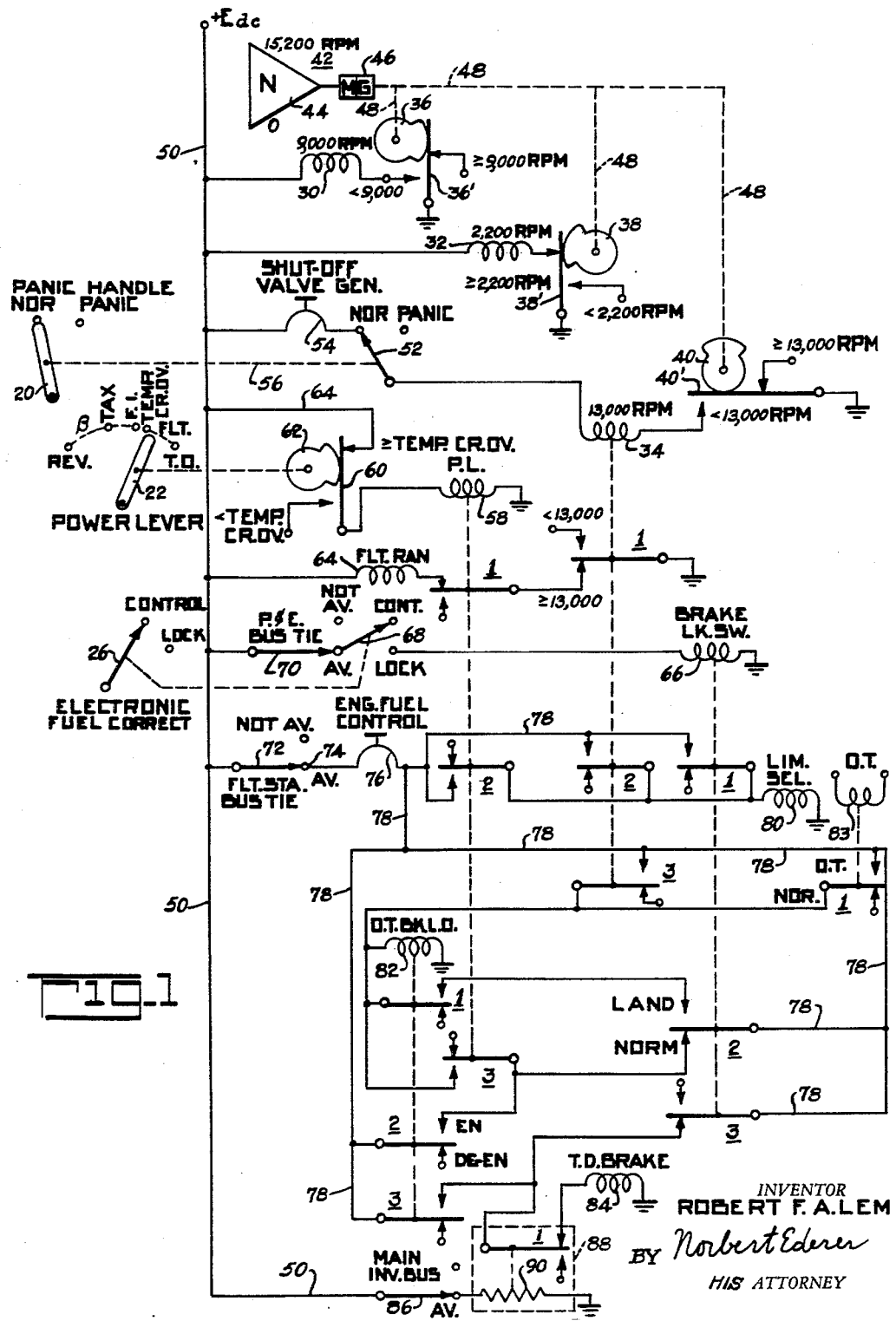
Figs. 1 and 2 are schematic drawings of energization circuitry for relays employed in the simulating apparatus as represented by all the drawings considered together.

Figs. 9 and 10 considered as a unit are schematic drawings of a fuel flow regulator computing system.

The present invention although not limited thereto, is shown by way of example as applied to the simulation of the turbine system of the C–130 multi-engine airplane; however it will be understood that the invention is also applicable as well to the simulation of other turbo-prop systems.

For a better understanding of the invention the aircraft equipment here simulated will first be briefly described. The propulsion and power units of the modern turbo-prop aircraft comprise a variable pitch, constant speed propeller that is driven through reduction gearing by a high speed gas turbine rotating at optimum speed, say 13,000 r.p.m. As more or less fuel is fed to the turbine to meet power requirements, the speed of the turbine-propeller combination is maintained constant by automatic adjustment of the propeller blade angle so that the power absorbed by the propeller matches the turbine power. In the pilot's compartment or cockpit of the aircraft are several primary controls, one for each engine, usually the power lever, condition lever and so-called "panic" handle all operable by the pilot. In addition, there are two switches, namely a fuel enrichment switch, again one for each engine, and a single electronic fuel correction switch common to the four engines. During normal flight operation the pilot is concerned only with the power lever which is movable through a continuous angle defining two distinct ranges of operation, namely, (1) a so-called Beta range and (2) an Automatic governing or Flight range.

The lower and upper limit positions for the power lever in the beta range are the full reverse and taxi positions. Intermediate of these two positions there is a ground idle position. The lower limit position in the flight range immediately follows the taxi position, and is denominated the flight idle (FI) position whereas the upper limit position in the flight range is the take-off (TO) position. The identification of the ranges and of the various positions is fully descriptive of the intended functions. The power lever position is of significance in determining the propeller blade pitch angle as described in the copending application of R. H. Goodwin for Aircraft Training Apparatus for Simulating Turbine Driven Propeller System, S.N. 700,830, filed December 5, 1957, and assigned to the assignee of the present invention.

The position of the power lever is of further significance in the operation of the turbine as regards the turbine inlet temperature ($T_5$). Throughout the beta range and continuing into the flight range to a position intermediate of the FI and TO positions the turbine inlet temperature is "Limited" and thereafter it is "Controlled." This position will be referred to as the temperature control cross-over position. In the temperature control region the power lever position controls both a coarse and a fine fuel flow valve continuously and in that sense schedules the turbine inlet temperature ($T_5$); in the temperature limited range the power lever position is determinative of $T_5$ merely by controlling the coarse fuel flow.

The condition lever has four positions, namely, (1) Feather, wherein the propeller can be feathered by main and auxiliary power systems upon failure of the turbine, (2) Normal, wherein the usual controls used in flight and for a ground start are available, (3) Air start, wherein the blade angle is gradually decreased from feather so as to drive the turbine by "windmilling" action preparatory to refiring the turbine, and (4) Ground stop, wherein the fuel supply is cut-off.

Supplemental to the condition lever in the Normal and Air start positions is a start button that is used for firing the turbine.

The "panic" handle is solely for emergency operation and overrides all other controls. It functions to shut off the fuel supply and feather the propeller, thus shutting down the power system.

The instruments in the cockpit that the pilot relies upon with reference to propeller control are the torque meter and the r.p.m. meter. The torque meter indicates the amount of positive or negative torque at the propeller drive shaft, i.e. positive torque as evidenced by turbine drive of the propeller, and negative torque due to "windmilling." The r.p.m. meter simply indicates the speed of the turbine. The turbo-prop aircraft is provided with a decoupling device between the propeller and turbine so that the drive connection is decoupled when negative torque exceeds a predetermined amount; thus, by observing the torque meter, the pilot can during an air start adjust the blade angle gradually for cranking the turbine so as not to exceed the maximum negative torque and cause decoupling.

The coarse fuel flow control is in the form of a so-called main fuel metering valve which is controlled according to the position of the power lever and also tensioned in accordance with the compressor inlet temperature ($T_2$), the compressor inlet pressure ($P_2$) and the turbine r.p.m. A potentiometer is ganged to the power lever and provides at its wiper a potential in accordance with the power lever position and serving as a scheduled turbine inlet temperature signal. Thermo-couples measure the actual turbine inlet temperature in the form of another electrical signal which is compared electrically with the scheduled $T_5$ signal; the resultant difference error signal controls the fine fuel flow adjustment, the so-called temperature datum valve (TDV). The fine control is exercised in this manner only in the temperature control region; in the temperature limited region the power lever or scheduled $T_5$ signal is disconnected from the comparison unit. Instead an electrical signal corresponding to a fixed reference maximum allowable $T_5$ is applied to the comparison unit and no control is exercised on the temperature datum valve except when the actual $T_5$ tends to exceed the maximum allowable reference. The main fuel metering valve is adjusted to supply 120% of the proper fuel flow required for the intended $T_5$ in accord with the power lever position, whereas the temperature datum valve as adjusted is intended to trim the fuel flow to just 100%, i.e. the proper amount of fuel flow for the required $T_5$.

The above description covers only basic features of the turbo-propeller system. Other features ancillary to operation and control of the turbo-propeller system under various conditions will be referred to in the description of the simulating system. The simulation of the propeller system per se which derives torque from the engine constitutes a separate invention that is disclosed and claimed in the above mentioned Goodwin application.

The simulating system herein described is shown by way of example as of the alternating current (A.C.) type although it will be understood that the system may comprise in whole or in part well known direct current (D.C.) techniques as desired. The system will be described in connection with its functioning under the control of a pilot and/or instructor for a complete simulated flight comprising ground start, take-off, cruising including in-flight conditions such as feathering due to engine malfunction, air start, etc., landing and engine shut down. For convenience in description, the various relays, etc., of the system are shown in the condition they would assume in usual flight.

Figure 2:
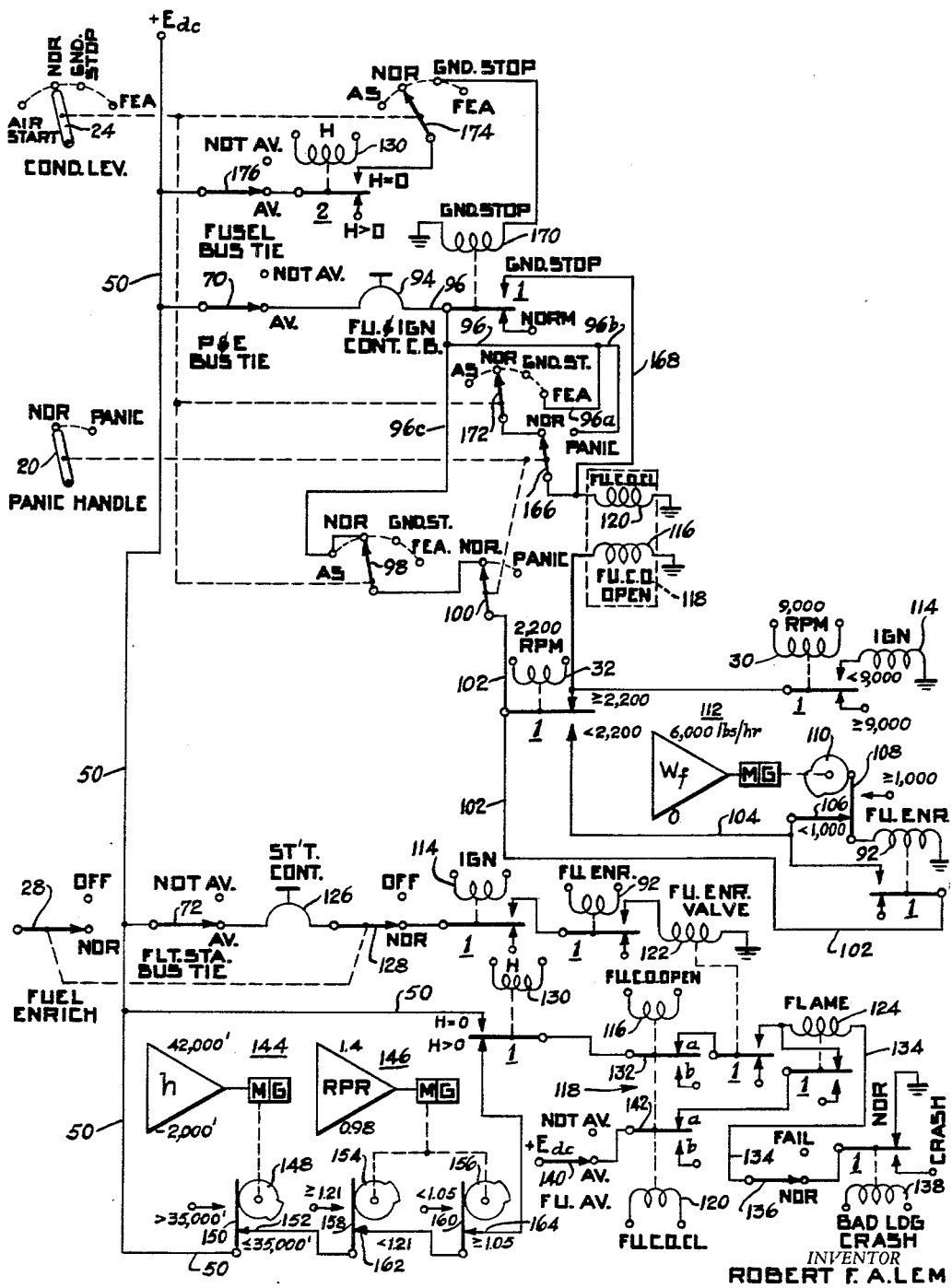

Referring to Figs. 1 and 2 there are shown cockpit controls which simulate the actual controls previously mentioned, namely, the panic handle 20, the power lever 22, the condition lever 24, the electronic fuel correction switch 26 and the fuel enrichment switch 28. These controls are provided individually for each engine system except the electronic fuel correction switch 26 which is common to the four engine systems. In general the corresponding circuits for the engine systems are identical and therefore unless otherwise specified it may be assumed that the circuitry illustrated and described hereinafter applies equally to each of the four engine systems. As previously stated, various relays, cams etc., are illustrated as under usual flight conditions, i.e. at an engine speed of approximately 13,800 r.p.m. "Usualism" as used herein will refer to such flight condition, whereas "normalcy" with reference to the state of energization of the relays follows the customary convention of the position of the relay contacts with all sources of energization removed.

Referring to Fig. 1 there are shown a usually deenergized 9,000 r.p.m. relay 30, a usually energized 2200 r.p.m. relay 32 and a usually deenergized 13,000 r.p.m. relay 34. These relays experience changes in the state of energization at their respective nominal engine speeds as determined by respective cams 36, 38 and 40. These cams are gang-operated by an N servo generally indicated as at 42 which includes a servo amplifier 44 controlling a servo motor generator combination 46, the servo motor driving the cams through the connections 48 which include suitable gear reducers. The input signals controlling the servo amplifier 44 and its operation are described in the aforementioned Godwin application. The N servo 42 operates between the indicated lower and upper limits representing computed engine speeds of 0 and 15,200 r.p.m. respectively. The designation of limits of servo operation will be indicated in similar manner for the other servos used herein. The servos employed in the herein-described engine simulation apparatus function in the same manner as described in the said Goodwin application.

As shown the cams position respective movable contacts 36', 38' and 40' which are electrically grounded and which engage and disengage respective pairs of fixed contacts in accordance with the r.p.m. computed by the N servo 42 to open and close the energization circuits for their respective relays at their nominal r.p.m. values. In each case there is a fixed contact which is connected to the respective relay coil the other contact being unconnected and serving merely as a stop. The other ends of the relay coils are connected to a direct voltage ($+E_{dc}$) bus 50, directly so in the case of the relays 30 and 32, and in the case of the 13,000 r.p.m. relay 34 through a switch contact 52 and a shut-off valve generator circuit breaker 54. The switch 52 is operable in unison with the panic handle 20 to which it is mechanically interconnected as indicated by the connections 56 and is therefore operable alternately to the normal and the panic position to energize and deenergize the relay even below 13,000 r.p.m. The reasons for intended deenergization of the relay 34 under such circumstances and the consequent effects thereof will become apparent from the description hereinafter. Switching the panic handle to the panic position results in certain other effects hereinafter described which the student may wish to avoid. By manually operating the shut-off valve generator circuit breaker 54 he may produce the desired effects of deenergizing the relay 34 without producing the additional effects of panic handle operation.

The circuit breaker 54 is of course intended in the actual aircraft to protect the emergency shut-off valve generator and as such will "pop" in case of overload; this will produce among others the effects which are realized by deenergization of the 13,000 r.p.m. relay 34 in the simulator. The pilot in the actual aircraft and the student pilot in the simulator can produce the same effects by manual operation of the circuit breaker 54. This he is not primarily taught to do per se in training; rather he is taught primarily the effects of overload in the emergency shut-off valve generator mains as reflected by manual, or if desired, remote instructor or computer controlled simulated circuit breaker failure. Once he has become acquainted with these effects he may be left to his own resources to reproduce them by his own design, i.e. operating the circuit breaker manually. The dummy circuit breakers connected in the energization circuit of other relays as described hereinafter are provided for similar reasons.

A usually energized power lever relay 58 has one end grounded and its other end is connected to the bus 50 through a contact 60 operated by a cam 62 which is ganged to the power lever 22, and through line 64 terminating in the bus 50. The cam 62 is contoured to complete the energization circuit for relay 58 with the power lever in the flight range and at or above the temperature cross-over point and to deenergize the same therebelow. A usually energized flight range relay 64 requires for energization that the power lever relay 58 be energized and that the 13,000 r.p.m. relay 34 be deenergized as is usually the case. The complete energization circuit for relay 64 is from the bus 50 through the relay coil, over the normally open (NO) contact 1 of the usually energized power lever relay 58 and the normally closed (NC) contact 1 of the usually deenergized 13,000 r.p.m. relay 34.

The remaining relays shown in Fig. 1 bear names of corresponding parts in the actual airplane. These names are not necessarily too indicative of the functions performed, not even in the actual aircraft. The actual significance and functions of these relays will become more apparent in connection with the discussion of operation of the simulated temperature limit and temperature control means. As shown a brake lock switch relay 66 requires for energization that the electronic fuel correction switch 26 be in the lock position. This is usually not the case as the switch 26 is usually in the indicated control position. It is shifted to the lock position generally only preparatory to landing.

The brake lock switch relay 66 and for that matter its entire energization circuitry may be common to all the engine systems, although as a matter of convenience separate relays may be provided as in the actual aircraft. These relays however would be energized and deenergized simultaneously. As shown one end of relay 66 is grounded whereas its other end is connected to the lock contact of a switch 68 gang-operated with the electronic fuel correction switch 26; its energization circuit is therefore usually open thereat. Upon shifting of the switch 26 from its usual control position to the alternate lock position the energization circuit continues through a prop and engine bus tie switch 70 to the bus 50 to complete the energization circuit provided the switch 70 is in its indicated "Available" position. The switch 70 may be operated by the instructor to the alternate "Not Available" position to simulate power failure on the prop and engine bus tie, in which case the brake lock switch relay will be deenergized in any event. In passing it may be mentioned that the label of "Electronic Fuel Correction" for switch 26 is similarly not too indicative of the function performed, not even in the actual aircraft, but is used because so named in the actual aircraft.

A flight station bus tie switch 72 is operable by the instructor from its usual indicated "Available" position to the alternate "Not Available" position in simulation of power failure on the flight station bus tie. Power failure on the flight station bus tie will result in deenergization of certain relays with atendant events duplicating corresponding events in the actual aircraft. The switch 72 is common to the four engine systems; individual circuits for each engine similar to that shown and described immediately hereinafter extend from its "Available" contact 74.

The voltage $+E_{dc}$ is routed from the contact 74 over an engine fuel control circuit breaker 76 to a line 78 and thence ultimately through relay coils to ground. It is to be noted that switching of the flight station bus tie switch 72 will necessarily result in the deenergization of the relays in all four engine systems, the switch 72 being common to the four engine systems. On the other hand the circuit breaker 76 is individually provided in each engine system so that its operation will necessarily result in deenergization of the relays of merely the associated engine system. The circumstances of operation of the circuit breaker 76 are analogous to those of circuit breaker 54. The relays deriving their energization from the bus 78 are a limit selector relay 80, an over temperature brake lock-out relay 82, and a temperature datum brake relay 84. The limit selector relay 80 is energized, if and only if the power lever relay 58 is deenergized, or the 13,000 r.p.m. relay 34 is energized, or the brake lock switch relay 66 is energized. Stated somewhat differently it is energized, if the power lever 22 is below the temperature cross-over point, or the engine r.p.m. is less than 13,000, or the electronic fuel correction switch 26 is placed in its lock position preparatory to landing. None of these conditions are usually satisfied and hence the relay 80 is usually deenergized. The respective paths for its energization from the line 78 are over the NC contact 2 of the power lever relay 58, the NO contact 2 of the 13,000 r.p.m. relay 34 and the NO contact 1 of the brake lock switch relay 66 through the relay coil to ground.

The over temperature brake-lock-out relay 82 is initially energized if the 13,000 r.p.m. relay 34 is energized, or a certain over temperature relay 83 is energized, or if the brake lock switch relay 66 is deenergized and the power lever relay 58 is deenergized. The respective paths from the line 78 through the coil of relay 82 to ground are over the NO contact 3 of the 13,000 r.p.m. relay 34, the NO contact 1 of the over temperature relay 83, and the series connection of the NC contact 2 of the brake lock switch relay 66 and the NC contact 3 of the power lever relay 58. None of these conditions are usually satisfied. The energization circuitry for the over temperature relay 83 will be described hereinafter; for the time being it may be assumed to be usually in the deenergized condition shown corresponding to a $T_5$ less than the maximum allowable under temperature limiting conditions. The conditions for energization of the relay 82 may be restated (assuming of course that the flight station bus tie switch 72 is in its available position and the circuit breaker 76 is in its normal condition) to be: the engine speed is less than 13,000 r.p.m., or $T_5$ is higher than the maximum allowable, or the power lever is below temperature cross-over and the electronic fuel correction for switch 26 is in its lock position (assuming of course that the prop and engine bus tie switch 70 is in its available position). It would appear without further consideration that the over temperature brake lockout relay is therefore usually deenergized; it is in fact but its hold circuits must be considered first and as will be seen they are usually open.

A first possible hold circuit for the over temperature brake lock-out relay 82 is provided through its NO contact 1 and the NO contact 2 of the brake lock switch relay 66 to the line 78. This hold circuit is usually open as the brake lock switch relay 66 is usually deenergized. A second hold circuit is available from the line 78 over the NO contact 2 of relay 82 and the NC contact 3 of the power lever relay 58. This hold circuit is usually open because the power lever relay is usually energized. It is now apparent that the relay 82 is necessarily usually deenergized.

The temperature datum brake relay 84 has one end of the relay coil grounded whereas its other end is connected through the NO contact 1 of a usually energized thermal time delay relay 88 and thence to the line 78 over two possible paths, namely the NC contact 3 of the brake lock switch relay 66 and the NO contact 3 of the over temperature brake lock-out relay 82. The former of these two paths is usually complete and hence the relay 84 is usually energized. The delay relay 88 is provided with a heater winding 90 whose one end is grounded and whose other end is connected to the available contact of a main inverter bus switch 86 whose movable contact is connected to the bus 50. The switch 86 is common to the four engine systems, but the relay 88 is provided individually for each engine. The thermal relay 88 functions as a repulsion device in that prior to energization the movable contact engages the fixed NC contact nearest to the heater. Upon energization the movable contact transfers after some time delay required for heating to the fixed NO contact farther from the heater. This is in contradistinction to the magnetic relays which are represented as attraction devices. The relay 88 is provided to simulate the time delay to energization of the temperature datum brake relay 84 in the actual aircraft subsequent to the closure of the main inverter bus switch 86. The instructor may simulate power failure on the main inverter bus by transferring the switch 86 from its indicated "Available" contact to the alternate "Not Available" contact, in which case the temperature datum brake relay 84 will necessarily release but after a similar time delay required for cooling.

The relays illustrated in Fig. 2 are associated with the starting and fuel flow control of the engine system and for this reason will be described in connection with the ground starting operation, although they are represented again as under conditions of normal flight. As illustrated and described in the aforementioned Goodwin application, depression of the starter button will crank up the engine and the N servo 42 (Fig. 1) will pick up speed. Even before starting and until a speed of 2200 r.p.m. is attained the 2200 r.p.m. relay 32 will be deenergized and as a consequence a fuel enrichment relay 92 (Fig. 2) will be energized. The energization circuit for the fuel enrichment relay 92 as well as for several other relays hereinafter described extends from the bus 50 (Fig. 2) through the available contact of the prop and engine bus tie switch 70 previously referred to. From here on the circuits are individual to each engine system and as shown include a fuel and ignition control circuit breaker 94 connected to a line 96 from which several branch lines indicated as 96a, 96b and 96c are split off.

The further energization circuit for the fuel enrichment relay 92 extends from the branch line 96c through a switch contact 98 ganged to the condition lever provided the same is in the normal or the air start position, thence through a switch contact 100 ganged to the panic handle 20 provided it is in its normal position, a line 102, over the NC contact 1 of the then deenergized 2200 r.p.m. relay 32, line 104, a fixed contact 106, and a movable cam operated contact 108 through the coil of relay 92 to ground. The contact 108 is operated by means of the cam 110 which is ganged to a fuel flow ($W_f$) servo 112 described in greater detail hereinafter. The servo 112 operates between the limits of 0 and 6,000 pounds per hour and the arrangement is such that the contact 108 engages the contact 106 for a fuel flow less than 1,000 pounds per hour, but is disengaged therefrom for a fuel flow of at least 1,000 pounds per hour. Upon starting the fuel flow is zero, resulting in the energization of the fuel enrichment relay 92.

It is to be noted that the conditions for a ground start, i.e. with the condition lever 24 in its normal position are the same as those for an air start in which case the lever 24 is placed in its air start position. As a general proposition the air starting operation is the same as the ground starting operation with a few noted exceptions hereinafter specified. Conversely the effect of shifting the condition lever to the ground stop or to the feather position will produce similar results and generally the same results will be obtained by shifting the panic handle from the normal to its panic position. Accordingly the distinctions between ground start and air start operation on one hand, and ground start, feather, and panic on the other hand will be covered by respective single descriptions to the extent that these operations are the same.

Upon initial energization of the fuel enrichment relay 92 a hold circuit therefor is established through its NO contact 1 which bridges the contact 106 and the line 104. When the engine attains a speed of 2200 r.p.m. the relay 32 is energized transferring its movable contact 1 to energize an ignition relay 114 and also a winding 116 of a fuel valve cut-off relay 118. The fuel enrichment relay 92 nevertheless remains energized through its hold circuit.

The operation of the fuel cut-off valve relay 118 simulates closely the operation of the fuel cut-off valve in the actual airplane in that energization of the "open" winding 116 will initiate fuel flow. The relay 118 however is a "latching" type relay which is provided with a second "closed" winding 120, energization of which implies cut-off of fuel. The latching type relay admits of four possible combinations of states of energization and deenergization of the windings namely: (1) only the "open" winding 116 energized in which the relay contacts will line up as in the case were there no "closed" winding 120 provided, (2) only the "closed" winding 120 energized, in which case all the relay contacts will line up as though the "open" winding 116 were not provided, (3) both windings energized, in which case some contacts will line up with one winding as though the other were not provided, whereas other contacts will line up with the other winding as though the one winding were not provided, and (4) both windings deenergized in which case the relay has "memory," in that it "remembers" which winding was last energized; its contacts will remain in the position of alignment with the last energized winding. As will be apparent hereinafter the energization of the "open" winding 116 requires, amongst other conditions, that the condition lever 24 be in the normal or air start position and that the panic handle 20 be in the normal position, whereas energization of the "closed" winding 120 requires that the condition lever be in the ground stop or feather position, or the panic handle in its panic position. These sets of conditions are mutually exclusive and therefore the third combination of simultaneous energization of both windings is not availed of in the operation of the simulator.

The third combination of deenergization of both windings is the case from prior to depression of the start button until the engine attains 2200 r.p.m. At such times the position of the contacts of relay 118 is random depending on which of the two windings was last energized prior to shutdown of the simulator power. Such shut down or simulator power should not be confused with a simulation of power shut-down in the actual aircraft. In the latter case certain switches in the simulator apparatus may be thrown but the power to the simulator apparatus remains connected and relays, servos, etc. remain operative. Rather simulator power shut-down implies literally disconnection of the power to the simulator resulting necessarily in the deenergization of all relays, servos, etc. Generally this is done at the conclusion of the training exercise terminating in a ground stop which, as will be seen, results in energization of the "closed" winding 120 and necessarily in the deenergization of the "open" winding 116. Consequently when simulator power is turned on for the next training exercise the contacts of the relay 118 will be and will remain lined up as though the winding 120 were energized (which in fact it is then not) and the winding 116 were not provided. As the speed of 2200 r.p.m. is attained and the winding 116 is energized, its ends being respectively connected to the NO contact 1 of the 2200 r.p.m. relay 32 and to ground. If simulator power had last been shut down with winding 116 energized the contacts of the relay 118 will already be lined up with the winding 116 prior to the energization of the relay 32; this is of no consequence as will be apparent hereinafter.

The ignition relay 114 derives its energization also from the NO contact 1 of the 2200 r.p.m. relay 32 through the NC contact 1 of the 9,000 r.p.m. relay 30 which at a speed below 9,000 r.p.m. is deenergized. The ends of the ignition relay 114 are connected respectively to the NO contact 1 of relay 30 and to ground. The energization of relay 114 at 2200 r.p.m. and its deenergization at 9,000 r.p.m. is in simulation of the operation of the ignition system in the actual aircraft. With the ignition relay 114 now energized and the fuel enrichment relay 92 still energized, a fuel enrichment valve relay 122 is energized simulating the conditions of opening of the fuel enrichment valve in the actual aircraft. Its energization coupled with the prevailing energization of the "open" winding 116 of the fuel cut-off valve relay results in the energization of a flame relay 124 to simulate presence of the flame in the actual aircraft.

The energization circuit for the fuel enrichment valve relay 122 extends from the bus 50 through the available contact of the previously referred to flight station bus tie switch 72 from which point the corresponding circuits of the four engine systems are individual. The circuit extends from switch 72 through a start control circuit breaker 126, through the "normal" contact of a switch 128 gang-operated with the fuel enrichment switch 28, over the NO contact 1 of the now energized ignition relay 114, the NO contact 1 of the still energized fuel enrichment relay 92 through the coil of relay 122 to ground. The fuel enrichment switch 28 is operable by the student pilot as previously explained normally to enable opening of the fuel enrichment valve and alternately to preclude the same. The pilot may achieve the same effect by operating the circuit breaker 126, whereas the instructor may simulate the same effect due to flight station bus tie failure, applied to all four engine systems at once, by operating the switch 72.

The energization circuit for the flame relay 124 extends from the bus 50 over the NO contact 1 of a then energized H relay 130, the movable contact 132 of the just energized winding 116 of relay 118 and the associated fixed "a" contact thereof corresponding to the position of then energization or last previous energization of winding 116, the NO contact 1 of the just energized fuel enrichment valve relay 122 through the coil of the flame relay 124, line 134 to an instructor controlled fail switch 136 and the "normal" contact thereof, and the NC contact 1 of a then and usually deenergized bad landing crash relay 138 to ground. The circuit is common to the four engine systems through switch 72 and again beginning with and including the switch 136. As the relay 122 was just energized when 2200 r.p.m. was attained, it is immaterial that the contacts of relay 118 had been aligned with winding 116 even prior to its energization, also occurring at 2200 r.p.m.

Upon energization of the flame relay 124 a hold circuit therefor is established from the voltage source $+E_{dc}$ through an instructor controlled fuel available switch 140 individual to each engine system and the associated available contact, the movable contact 142 of relay 118, and its associated fixed "a" contact then engaged by reason of the then energization of the "open" winding of relay 118, the NO contact 1 of the flame relay 124, and through the coil of relay 124 ultimately to ground. The H relay 130 may be energized as shown in Patent No. 2,731,737 granted to R. G. Stern on January 24, 1956, and reflects when in the indicated deenergized condition an above ground location of the simulated flight, whereas in the alternate energized condition the position of the simulated flight is reflected as on ground. For the previously assumed ground start the relay 130 was energized. The bad landing crash relay 138 may be energized by means to simulate a bad landing crash to result in its energization and the consequent extinction of the flame as reflected in the simulator by release of the flame relay 124. However such means form no part of the present invention and therefore are not shown. Normally the relay 138 is deenergized as illustrated and therefore energization of the flame relay 124 is possible.

In the case of an air start the starting operation is initiated from an initial 0 r.p.m. as described in the aforementioned Goodwin application. The ensuing chain of events is generally similar to that of the ground start operation, except that the H relay 130 will be necessarily deenergized so that the energization circuit for the flame relay 124 will be derived through the NC contact 1 of relay 130. For a satisfactory air start the sea level altitude must be no greater than 35,000 feet and the ram pressure ratio must be within the limits of 1.05 and 1.21. The ram pressure ratio is defined as the ratio of the compressor inlet pressure ($P_2$) to the free stream static pressure. This ratio is not necessarily unity as $P_2$ may differ from the free stream static pressure due to the effects of air speed. These two conditions for a satisfactory air start are computed by a sea level altitude ($h$) servo 144 and a ram pressure ratio (RPR) servo 146 respectively. These two servos and associated cams and contacts are common to the four engine systems.

The $h$ servo 144 may be energized as shown in the aforementioned Patent No. 2,731,737. As illustrated in Fig. 2 the servo operates between the limits of $-2,000$ feet and 42,000 feet and gang operates a cam 148 which in turn operates a movable contact 150 to engage a stationary contact 152 for altitudes not in excess of 35,000 feet and to disengage therefrom for greater altitudes. The manner of control of the RPR servo 146 will be described in detail hereinafter; suffice it for present purposes to state that it operates between the ratio limits of 0.98 and 1.4 and as shown in Fig. 2 drives cams 154 and 156 which in turn operate movable contacts 158 and 160 respectively. The cam 154 is arranged to provide engagement of the contact 158 with a cooperating fixed contact 162 for ram pressure ratios less than 1.21 and to provide disengagement therefrom for ratios of at least 1.21. Similarly the cam 156 is arranged to provide engagement of the contact 160 with a cooperating stationary contact 164 for ram pressure ratios of at least 1.05 and to provide disengagement in the case of lower ratios.

As illustrated the conditions for a satisfactory air start are satisfied. The energization circuit for the flame relay 124 in the case of an air start is from the bus 50 over the contacts 150, 152, 158, 162, 160 and 164 to the NC and then movable contact 1 of the H relay 130, onward of which the remainder of the energization circuitry is the same as in the case of ground start. The circuit up to and including the movable contact 1 of the H relay 130 is common to the four engine systems. The flame relay 124 will hold itself in subsequent to an air start in the same manner as in the case of ground start.

As previously mentioned the placement of the condition lever 24 in the ground stop or feather position will necessarily result in deenergization of the "open" winding 116 of relay 118 and may result in the energization of its "closed" winding 120. Similarly the placement of the panic handle 20 in the panic position, irrespective of the position of the condition lever 24, will obtain the same sets of effects. The energization of the "closed" winding 120 will result in cut-off of the fuel and extinction of the flame. The flame relay 124 will necessarily release because of the shifting of its movable contacts 132 and 142 from the illustrated "a" positions to the alternate "b" positions. The energization circuit for the "closed" winding 120 extends, reversing the previous order, from ground through the relay coil and thence over several branch paths. One such path is to a switch contact 166 operable in unison with the panic handle 20, and a second one extends over line 168 to the NO contact 1 of a usually deenergized ground stop relay 170. Continuing from the panic switch 166, if it is in the normal position, the path therefrom is to the switch contact 172 operable in unison with the condition lever 24 and is usually open thereat, requiring positioning of the lever 24 to its feather position for completion. In the feather condition the energization circuit may be completed through the branch line 96a connected to the feather contact of switch 172. If the panic handle 20 is placed in its panic position, the switch 166 is tied to the branch line 96b which is connected to the panic contact of switch 166 thereby providing possible energization of winding 120 irrespective of the position of the condition lever 24. It is apparent that the panic handle may provide an overriding effect whether the simulated craft is on ground, or in the air. Continuing the first referred-to energization circuit for the winding 120, it may be completed from the NO contact 1 of the ground stop relay 170 provided that relay 170 is energized as its movable contact 1 connects directly to line 96. Energization of the ground stop relay 170 requires that the condition lever 24 be in its ground stop position, that the simulated flight is on ground and that power is available on the fuselage bus tie. These conditions may be satisfied as follows: one end of relay 170 is grounded whereas its other end is tied to the ground stop contact of a switch 174 operable in unison with the condition lever 24. From here on the remainder of the energization circuit for the ground stop relay 170 is common to the four engine systems. The movable contact of switch 174 (still individual to each engine system) in turn is tied to the NO contact 2 of the H relay 130 requiring energization of relay 130 for completion; this is equivalent to an on ground condition. The circuit is completed from the movable contact 2 of relay 130 through an instructor operated fuselage bus tie switch 176, provided it is in its indicated available position, to the bus 50.

Reverting to the assumed attainment of 2200 r.p.m. due to ground start or air start, energization of the fuel enrichment valve relay 122 results ultimately in a momentary gush of enrichment fuel flow of the $W_f$ servo 112 of greater than 1,000 lbs. per hour as will be seen hereinafter. Consequently the hold circuit for the fuel enrichment relay 92 is opened, and with its original energization circuit previously opened, the relay 92 releases and remains in its illustrated usually deenergized state thereafter. This in turn results in deenergization of the fuel enrichment valve relay 122 and also in the cessation of the gush of heavy fuel flow in excess of 1,000 lbs. per hour as reflected by the $W_f$ servo 112. Its cam contact 108 may once more engage the stationary contact 106 but this is of no further moment insofar as the fuel enrichment relay 92 is concerned, as the 2200 r.p.m. relay 32 has been energized. Release of the fuel enrichment valve relay 122 opens the original energization circuit for the flame relay 124 but this relay holds itself through its previously described hold circuit so that the flame is sustained. As will become apparent hereinafter engine speed continues to pick up until at 9,000 r.p.m. relay 30 drops out (Fig. 1) which results in deenergization of the ignition relay 114. This simulates shut down of the ignition system in the actual aircraft; actually it is of no moment insofar as the fuel enrichment valve relay 122 is concerned, this relay having released with the release of the fuel enrichment relay 92 as described above. Thereafter the engine continues to accelerate until at 13,000 r.p.m. the previously energized relay 34 (Fig. 1) releases. The effects on the other relays shown in Fig. 1 attendant to the starting operation will be discussed hereinafter.

Figure 5:
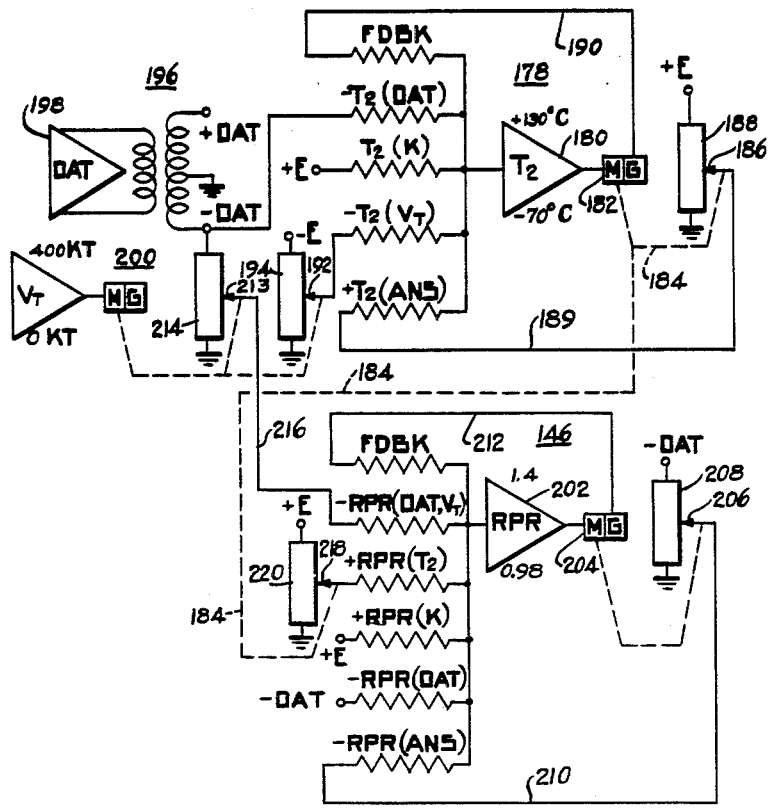
Fig. 5 is a schematic drawing of compressor inlet temperature ($T_2$) and ram pressure ratio (RPR) servo computing systems.

The performance of the engine system depends on outside ambient atmospheric conditions such as outside air temperature, true air speed, altitude, ram pressure ratio, etc., as previously intimated in connection with the description of the RPR servo 146 the operation of which will now be described with reference to Fig. 5. Inasmuch as this servo is dependent on the operation of a compressor inlet temperature ($T_2$) servo 178, also illustrated in Fig. 5, the $T_2$ servo operation will be described first. The entire circuitry illustrated in Fig. 5 is common to the four engine systems.

The various servos shown in the present application are operated in a manner analogous to that of the previously referred to Goodwin application and the details of operation need only briefly be summarized. The $T_2$ servo 178 may be considered exemplary in this regard. As shown the servo includes a servo summing amplifier 180 which is supplied by several inputs hereinafter specified and is provided with an output winding for controlling a servomotor. The winding is not shown expressly but is included in the servo motor which together with a velocity feedback generator is indicated by the motor generator combination (MG) 182. The servomotor is an A.C. type motor whose direction of rotation depends on the phase of the control voltage delivered by the servo amplifier 180. The control voltage may be either in phase with or in phase opposition to a reference voltage $+E$ resulting in opposite directions of rotation. The velocity of rotation is dependent upon the magnitude of the voltage delivered to the motor generator combination 182 by the servo amplifier 180. The magnitude and phase of the servo amplifier output voltage depends upon the summation of the input voltages applied to the amplifier through properly proportioned summing resistors. These input voltages again are either in phase with or in phase opposition to the reference voltage $+E$. The servo operates as a positioning servo and its servomotor is normally at a standstill as the net input signal to the servo amplifier is zero. If there is a change in an external input signal, the servo motor will move in the required direction to reflect the change in $T_2$. In moving the motor positions through connections indicated as 184 (which include suitable gear reduction) the wiper 186 of an answer potentiometer 188 which is energized at its upper end by the reference A.C. voltage $+E$ and is grounded at its lower end. The potentiometer 188 is a "linear" potentiometer, i.e. of uniform contour so that the position of the wiper 186 is proportional to the computed value of $T_2$. Wiper positions at the upper and lower ends represent computed upper and lower limits of computed $T_2$ of $+130°$ C. and $-70°$ C. respectively. This convention of correspondence of limits is adhered to in the representations of servos and potentiometers herein described.

The voltage derived from the wiper 186 is fed over line 189 to a $+T_2$ (ANS) input of the amplifier 180 in inverse feedback relation so that as the wiper position is changed with motor rotation due to change in an external input signal the answer input will change oppositely until the summation of the input signals to the amplifier 180 is once more zero whence the motor comes to a stop once more and the wiper 186 reflects the new $T_2$. To improve the response of the servo velocity feedback is applied from the generator in the MG combination 182 over line 190 to a feedback (FDBK) input of the amplifier 178 and the voltage appearing on line 190 represents rate of change of temperature.

The servo amplifier 180 is supplied in addition to the answer and feedback signals with input signals $-T_2$ (OAT) representing the contribution on $T_2$ due to outside air temperature, an input $-T_2(V_T)$ representing the effect on $T_2$ of true air speed and a signal $T_2(K)$ representing a conversion constant to produce a computation of $T_2$ in degrees C. These three external input signals to the amplifier are respectively supplied with the voltages $-OAT$ representing outside air temperature, a voltage derived from the wiper 192 of a true air speed potentiometer 194 and the reference A.C. voltage $+E$. The voltage $-OAT$ is derived from the secondary of a transformer 196 whose primary is energized by an OAT amplifier 198 which in turn is supplied by inputs as shown in the aforementioned Patent No. 2,798,308. The potentiometer 194 is connected at opposite ends to ground and to the A.C. reference voltage $-E$ which is equal in magnitude and of opposite phase to the previously referred to reference voltage $+E$. The wiper 192 is operated by the true air speed servo 200 which operates between the indicated limits of 0 and 400 knots and may be energized as shown in the aforementioned Patent No. 2,784,501. The potentiometer 194 is contoured for the proper relation of $T_2$ with changing $V_T$.

The RPR servo 146 is provided with a servo summing amplifier 202 and a motor generator combination 204 which drives the wiper 206 of a linear answer potentiometer 208 and other potentiometers hereinafter specified and also the cams 154 and 156 previously referred to in connection with the description of the air start operation. The potentiometer 208 is connected at opposite ends to ground and to the voltage −OAT. The potential of the wiper 206 is applied to the −RPR(ANS) input of amplifier 202 over line 210. The combination of energization of the potentiometer 208 by the voltage −OAT and of the answer type application of the derived voltage of the wiper 206 to the input of amplifier 146 results in a division of the summation of the external inputs to the amplifier 202 by OAT. The summation of the external inputs to the amplifier represents the product of RPR and OAT. However by reason of the division by OAT the position of the servo 146 represents the required RPR. A velocity feedback voltage from the generator in the MG combination 204 is applied to the FDBK input of the amplifier 202 over line 212.

The external inputs to the amplifier 202 are −RPR(OAT, $V_T$) representing the contribution to the product of RPR and OAT of the product of outside air temperature and a function of true air speed, +RPR($T_2$) representing the contribution of $T_2$, +RPR(K) representing a scale conversion constant, and −RPR(OAT) representing the contribution due to outside air temperature. These external inputs are supplied in order by a voltage derived from the wiper 213 of a $V_T$ card 214 via line 216, by a voltage derived from the wiper 218 of a $T_2$ potentiometer 220, by the reference voltage +E, and by the voltage −OAT. The potentiometer 214 is connected at opposite ends to ground and to the voltage −OAT and is contoured to provide the proper function of the true air speed which when multiplied by OAT represents the proper contribution to the product of RPR and OAT. The potentiometer 220 is connected at opposite ends to ground and to the voltage +E and is contoured to provide the proper contribution of $T_2$. The potentiometers referred to herein are of circular band form in practice but are represented in plane development for clarity. For a more detailed description of the arrangement of the potentiometers reference may be had to the aforementioned Patent No. 2,798,308.

In addition to the ambient variables just discussed the simulating apparatus herein described employs positive and negative voltages $\pm\theta_2$ representing the adiabatic temperature ratio $\theta_2$, i.e.

$$\frac{T_2}{T_o}$$

where $T_o$ is the reference temperature at sea level, and also voltages $\pm\sqrt{\theta_2}$ representing the square root of this ratio, voltages $\pm\delta_2\sqrt{\theta_2}$ representing the product of the relative pressure ratio and the square root of the adiabatic temperature ratio. The relative pressure ratio ($\delta_2$) is $$\frac{P_2}{P_o}$$

where $P_o$ is the reference pressure at sea level. The derivation of these voltages may be as described in the aforementioned Patent No. 2,798,308. Additionally there are employed positive and negative voltages representing the reciprocals of the just referred to voltages and are identified by $$\pm\frac{1}{\theta_2}, \pm\frac{1}{\sqrt{\theta_2}} \text{ and } \pm\frac{1}{\delta_2\sqrt{\theta_2}}$$

These voltages may be obtained by well-known servo techniques from their respective reciprocal voltages as for example by the division technique referred to in connection with the description of the RPR servo 146.

The operation of the coarse fuel flow control is represented by a regulator fuel flow ($W_t/\delta_2\sqrt{\theta_2}$) summing amplifier 222 indicated in Fig. 10. The amplifier and the inputs thereto are arranged to compute the equivalent fuel flow variable $W_t/\delta_2\sqrt{\theta_2}$ rather than the fuel flow variable $W_t$ as a matter of convenience in computation. Similar "equivalent" variables will be encountered subsequently. The amplifier is provided with an output transformer 224 from whose secondary the voltage $+(W_t/\delta_2\sqrt{\theta_2})$ is supplied to the $W_t$ servo 112 in Fig. 8. The arrangement is such that when the summation of the input signals to the amplifier 222 is net negative, "fuel flows" and the $W_t$ servo 112 will move from its minimum position corresponding to 0 lb. per hour.

In simulation of the functioning of the apparatus in the actual aircraft the amplifier 222 is controlled basically by signals reflecting the power lever position, the turbine r.p.m., $T_2$ and $P_2$. However its operation falls into three distinct regimes. Initially upon actuation of the starting button the input and output signals to the amplifier 222 follow a so-called acceleration schedule with increasing r.p.m. which increases monotonically from zero fuel flow. At 2200 r.p.m. there occurs the previously referred to momentary surge of fuel flow effective to ignite the flame. The fuel flow immediately drops down and then increases again monotonically in accord with the acceleration schedule. The r.p.m. continues to build up and more fuel is delivered until a cross-over point for the steady-state fuel flow schedule is reached.

So far the operation has been temperature limited and continues to be so limited in the second regime of steady-state fuel flow schedule. The acceleration-steady state crossover point is a function not directly of r.p.m. (N) but of equivalent r.p.m. ($N/\sqrt{\theta_2}$) and thus may be variable depending upon compressor inlet temperature. However a speed of 12,500 r.p.m. is representative for the cross-over. The fuel flow after cross-over drops off somewhat and then levels off with increasing r.p.m. The r.p.m. will ultimately be fixed by the governing system as described in the aforementioned Goodwin application. No further changes occur, at least not in the regulator fuel flow system, until the pilot positions the power lever into the flight range past the temperature cross-over point at which time the third regime of temperature control takes over. This results in a shift of the steady-state fuel flow schedule to provide fuel flow at a value of approximately 120% of the fuel flow proper for the scheduled $T_5$. A temperature datum valve simulating system described in greater detail hereinafter further trims the fuel flow to just the required 100% proper for the scheduled $T_5$.

Prior to and immediately subsequent to initiation of the starting operation the only non-grounded input to the amplifier 222 is the input $-\bar{W}_t(T_2)_a$. The signal applied to this input represents the effect during the acceleration regime of $T_2$ on $\bar{W}_t$. $\bar{W}_t$ is the short notation for the transformed or "equivalent" or "corrected" fuel flow variable $W_t/\delta_2\sqrt{\theta_2}$. All signals applied to the amplifier 222 are of the $\bar{W}_t$ type. As such no special provision is necessary for their generation in accordance with $P_2$ or in some instances even in accordance with $T_2$. Rather the effect of $P_2$ and $T_2$ on actual $W_t$ is taken care of by conversion from $\bar{W}_t$ in the $W_t$ servo 112, i.e., subsequent to the simulated coarse fuel flow control represented by amplifier 222. In this regard the simulator philosophy differs from that of the actual aircraft and permits simplification in the computation.

For the particular $\bar{W}_t(T_2)_a$ signal presently considered there is, as a matter of fact, a modifying contribution due to $T_2$. This signal is supplied from an inverting amplifier 226 over line 228 and the NC contact 1 of a then deenergized "part throttle override" relay 230. The circumstances of the change of energization state of relay 230 will be discussed hereinafter. On the input side of the inverting amplifier 226 the signal is of reversed polarity and appears as $+\bar{W}_t(T_2)_a$. It is traced over line 232

(continuing in Fig. 9), the NC contact 1 of the then deenergized flight range relay 64 to the wiper 234 of an N potentiometer 236 whose lower end is grounded and whose upper end is connected over line 238 to a potential $+W_f/\delta_2\sqrt{\theta_2}(T_2)_a$. The control of wiper 234 by the N servo 42 contributes the effect of r.p.m. to the input signal $-\bar{W}_f(T_2)_a$ to the amplifier 222 and the potentiometer 236 is contoured for the proper function of N. This acceleration schedule voltage $+W_f/\delta_2\sqrt{\theta_2}(T_2)_a$ is generated within a block 240 common to the four engine systems which includes a transformer 242 from the upper end of whose secondary the voltage is supplied to the line 238. Its lower end is grounded. It is unnecessary to provide especially for the contribution of power lever position to $\bar{W}_f(T_2)_a$, as the power level will necessarily be in the ground idle position for starting.

The primary of the transformer 242 is energized by the output voltage of an amplifier 244 which is supplied by inputs $f(T_2)$ and $-1/\sqrt{\theta_2}$. The latter input is supplied by the like-named voltage, whereas the former input is derived from the wiper 246 of a $T_2$ potentiometer 248 which is connected at its lower and upper ends respectively to the voltage $-1/\sqrt{\theta_2}$ and to ground and is contoured approximately hyperbolically.

With an initial 0 r.p.m. the signal appearing at the input $-\bar{W}_f(T_2)_a$ to the amplifier 222 (Fig. 10) is zero. As the r.p.m. increases the signal becomes increasingly negative resulting in an increased fuel flow. At 2200 r.p.m. the fuel enrichment valve relay 122 is energized and as a consequence the voltage $-1/\sqrt{\theta_2}$ is applied over its NO contact 2 to the input $-\bar{W}_f(K)$ of amplifier 222. This renders the net summation of input signals to the amplifier 222 even more negative and produces the surge of fuel flow previously mentioned. The flame is produced and thereafter the relay 122 drops out again as previously described, grounding the input $-\bar{W}_f(K)$ through the NC contact 2 of the relay. The build-up of fuel flow reverts back to the sole control of the input signal $-\bar{W}_f(T_2)_a$ and continues to increase.

The net summation of signals to the steady-state fuel flow inputs $-\bar{W}_f(LEV,N)_s$, $+\bar{W}_f(1/\sqrt{\theta})_s$, and $-\bar{W}_f(LEV, T_2)_s$ is also building up. The signals thereto are available on the lines 250, 252 and 254 respectively and the thereto respectively connected NO contacts 2, 3 and 4 of the PTO relay 230. The relay 230 is then deenergized and therefore these inputs are grounded through its respective NC contacts 2, 3 and 4.

These signals are utilized however as a means to decide when to switch from the acceleration schedule to the steady-state schedule. They are applied from the lines 250, 252 and 254 along with the input $+\bar{W}_f(T_2)_a$ from line 232 through respective summing resistors to a summing amplifier 256, whose output is applied to a phase sensitive rectifier 258, whose rectified output signal in turn excites a thyratron 260 which controls the energization of the relay 230. The arrangement is such that the thyratron 260 fires and therefore the relay 230 is energized when the net summation of the input signals to the amplifier 256 is zero or positive. Initially the sumation is negative and thereafter the positive signals increase more rapidly than the negative signals until the acceleration-steady state cross-over point corresponding to approximately 12,500 r.p.m. is reached. At such time the net input to the amplifier 256 is zero, the thyratron 260 fires, and the relay 230 is energized. The energization results in grounding of the acceleration scheduyle input $-\bar{W}_f(T_2)_a$ through the NO contact 1 of relay 230 and application of steady-state input signals to the amplifier 222 from the lines 250, 252, 254 respectively over the NO contacts 2, 3 and 4 of relay 230. The net value of the signals applied over the NO contacts 2, 3 and 4 of relay 230 immediately subsequent to the cross-over is equal to the signal $-\bar{W}_f(T_2)_a$ just before cross-over; thereafter the net negative value decreases; accordingly the fuel flow decreases and thereafter levels off to the steady-state value. The remaining inputs to the amplifier 222 remain grounded.

The esteady-state signals on the lines 250, 252 and 254 are supplied thereto respectively over the NC contacts 2, 3 and 4 of the then deenergized flight range relay 64 and will be considered separately in order. The signal $-\bar{W}_f(LEV, N)_s$ is applied to the NC contact 2 of relay 64 from a wiper 262 of a linear N potentiometer 264 which is returned to ground from a tap point 266 located close to the upper end of the potentiometer through a resistor 268. Card 264 is energized at a second tap point 270, also located close to the upper end of card 264 but somewhat below the tap point 266, by a voltage determined in accordance with power lever position and $1\sqrt{\theta_2}$. The effect of the energization at the tap point 270 and return to ground at tap point 266, assuming that the power lever position and $\theta_2$ remain constant, is to provide a voltage at the wiper 262 equal to the voltage at point 270, until the wiper passes this point corresponding to an r.p.m. of approximately 12,500. Thereafter the wiper voltage changes linearly until the tap 266 is reached corresponding to the governor speed of approximately 13,800 r.p.m. Thereafter the wiper voltage remains constant at the voltage of point 270.

The energizing voltage to the tap point 270 is derived over line 272 from the wiper 274 of a potentiometer 276 which has a central short circuited conductor portion 278 and is otherwise linear. The wiper 274 is gang-operated in accordance with the position of the power lever 22 by means of the connections 280. The conductor portion 278 represents the range from ground idle to flight idle and as shown is connected to ground through resistor 281. The lower end of the potentiometer 276 which corresponds to the reverse position of the power lever is returned through a resistor 282 to the voltage $-1\sqrt{\theta_2}$, whereas the upper end is directly connected to this voltage. The effect of this arrangement is to provide at the wiper 274 a voltage of minimum magnitude and negative phase for the ground idle to flight idle region; this assures equal conditions for a ground start and an air start. The arrangement further provides an increase in magnitude from this minimum voltage on either side of the conductor portion, the slope in the beta range being positive and of lesser magnitude than that in the flight range wherein it is negative. The consequence of the construction of the potentiometers 276 and 264 and their energization is that the signal on the wiper 262 remains constant in the ground idle to flight idle range until approximately 12,500 r.p.m. is exceeded.

The input $+W_f(1/\sqrt{\theta})_s$ is energized by the $+1/\sqrt{\theta_2}$ voltage applied to the NC contact 3 of the flight range relay 64. This voltage is inherently positive and therefore tends to decrease fuel flow. The input $-\bar{W}_f(LEV, T_2)_s$ is applied to the NS contact 4 of the flight range relay from a wiper 284 of a power lever card 286 via line 288. The potentiometer 286 is energized at opposite ends by a voltage routed from the wiper 290 of a $T_2$ potentiometer 292 over line 295. The potentiometer 286 is provided with two intermediate taps 294 and 296 which are tied together and returned through a resistor 298 to ground. The interval between taps 294 to 296 represents a constant voltage range of from flight idle to ground idle. The effect of the manner of energization and construction of the potentiometer 286 is to provide, as the wiper departs from the taps 294 and 296, a negative or positive increase depending on whether $T_2$ is positive or negative. The potentiometer 292 is contoured approximately hyperbolically and is grounded intermediate its ends at a tap point corresponding to a temperature of 0° C. It is energized at the −70° C.

limit by the voltage $+1/\sqrt{\theta_2}$ whereas at its $+130°$ C. limit it is energized by the voltage $-1/\sqrt{\theta_2}$ through a resistor 300. Thus for positive $T_2$ the signal to the input $-\overline{W}_f(LEV, T_2)_s$ is generally negative.

The amplifier 222 is provided with three further inputs $-\overline{W}_f(LEV)_s$, $-W_f(1/\theta)_s$ and $-W_f(N/\sqrt{\theta})_s$ which are supplied with signals respectively over lines 302, 304 and 306, which in turn are presently grounded respectively through the NC contacts 5, 6 and 7 of the flight range relay 64. In proceeding from the start from either the ground idle or flight idle position into the flight range the power lever is positioned past the temperature crossover point towards the take-off point. This is done after the governer speed of 13,800 r.p.m. is attained and therefore, referring to Fig. 1, necessarily subsequent to the release of the 13,000 r.p.m. relay 34. As a result, the power lever relay 58 and also the flight range relay 64 are energized. Referring again to Fig. 9, energization of the flight range relay grounds out the previously discussed acceleration and steady-state inputs to the amplifier 222 through the NO contacts 1 to 4 of relay 64 and applies non-zero signals to the lines 302, 304 and 306. These three signals are determined according to the operation of an equivalent r.p.m. ($N/\sqrt{\theta_2}$) servo 308 which operates between the indicated limits of 0 and 18,000 equivalent r.p.m. The servo may be controlled by the N servo 42 and a suitable $\sqrt{\theta_2}$ signal as indicated in the aforementioned Patent 2,798,308.

The signal to the NO contact 5 of relay 64 is applied over a line 310, which is connected to a wiper 312 of a power lever potentiometer 314, which is energized at a tap point 316 located near its upper end by a voltage determined according to $N/\sqrt{\theta_2}$ and $-1/\theta_2$ as derived from the wiper 318 of an $N/\sqrt{\theta_2}$ card 320. The voltage at the wiper 318 is also applied directly over line 322 to the NO contact 6 of the flight range relay 64 whereas another $N/\sqrt{\theta_2}$ control voltage is applied to the NO contact 7 of relay 64 over line 324 from a wiper 326 of an $N/\sqrt{\theta_2}$ card 328. The potentiometers 314, 320 and 328 are so contoured and energized as to provide the proper relation between fuel flow vs. power lever position and $N/\sqrt{\theta_2}$. In particular the potentiometer 314 is grounded in its upper region below the tap point 316, the potentiometer 320 is similarly connected and is energized at its upper end by the voltage $-1/\theta_2$. The potentiometer 328 is provided with a similarly located tap point 320 which is returned to ground through a resistor 332 and is energized by the reference voltage $+E$ at its upper end.

It will be recalled that at the point of cross-over from the acceleration fuel flow schedule to the steady-state fuel flow schedule, the fuel flow decreased first and thereafter leveled off. The leveling-off effect had taken place at approximately 13,400 r.p.m. and is due to a chain of events described immediately hereinafter. For a proper appreciation of these events it should be understood that $T_5$ and the engine shaft horsepower (Q) build-up proceeds generally along the same lines as the fuel flow build-up. Specifically these variables increase until the transfer from the steady-state to the acceleration schedule, decreases thereafter and ultimately level off at about 13,400 r.p.m. The leveling-off point is determined by the matching of the shaft horsepower delivered to the actual propeller load which occurs or should occur initially at a speed of 13,400 r.p.m. and continue later to the governing speed of 13,800 r.p.m. However the propeller load may not have increased according to schedule with the result that the r.p.m. is initially excessive. In the actual aircraft there will occur an oscillation until the r.p.m. finally settles at 13,400 with a proper matching of shaft horsepower and propeller load and any attempts of changes in steady-state fuel flow, $T_5$ and Q will be subjected to the same oscillation until level values are attained. This effect is represented by means of the input $+\overline{W}_f(\Delta N/\sqrt{\theta})$. This input is usually grounded through the NC contact 2 of a usually deenergized "prop-topping-governor" relay 344. Its NO contact 2 is supplied with a signal reflecting excessive $N/\sqrt{\theta_2}$. The arrangement is such that the relay 334 will be energized when $N/\sqrt{\theta_2}$ is greater than that corresponding to the required 13,400 r.p.m. This will introduce a positive signal at the input $+\overline{W}_f(\Delta N/\sqrt{\theta})$. The effect of the added positive signal is to decrease the fuel flow and consequently also the r.p.m. This results in a reduction in the magnitude of the signal $+\overline{W}_f(\Delta N/\sqrt{\theta})$ which in turn results in a more negative net input to the amplifier 222 tending to increase fuel flow again with an attendant increase in r.p.m. This chain of events is oscillatory; the r.p.m. and fuel flow eventually settle at the scheduled values by reason of the effects of the fluctuating r.p.m. on the inputs $-\overline{W}_f(LEV)_s$, $-\overline{W}_f(1/\theta)_s$ and $-\overline{W}_f(N/\sqrt{\theta})_s$ at which time the PTG relay 334 drops out again.

The PTG relay 334 is "a phase sensitive" relay similar to the PTO relay 230. It is energized by a thyratron 336, which is in turn excited by a phase sensitive rectifier 338, which derives its control signal from a PTG amplifier 340, whose output is also applied to the NO contact 2 of relay 334 to serve as the signal to the input $+W_f(\Delta N/\sqrt{\theta})$ of amplifier 222. The PTG system simulates the operation of a flyball governor, whereas the PTO system simulates the operation of cams and linkages in the actual aircraft. The arrangement of the PTG system is such that the thyratron 336 fires and the relay 334 is energized whenever the net input to the amplifier 340 is zero or negative. Such net input is usually positive as determined by the prevalence of the positive inputs $+1/\sqrt{\theta_2}$ (supplied by the like-named voltage) and $+LEV$ (determined in accordance with the power lever position as described hereinafter) over the negative voltage supplied to the input $-N/\sqrt{\theta_2}$. The $-N/\sqrt{\theta_2}$ input is derived from the wiper 342 of a linear N potentiometer card 344 that is connected at its upper and lower ends respectively to the $-1\sqrt{\theta_2}$ voltage and to ground. The position of the wiper 342 thus represents $-N/\sqrt{\theta_2}$ and the voltage derived therefrom, is subsequent to the leveling off of r.p.m. and fuel flow, of smaller magnitude than the summation of the other two inputs of amplifier 340. When it equals or exceeds such summation the thyratron 336 fires with the attendant events previously described. The input $+LEV$ derives its signal over a line 345 from a wiper 346 of a linear power lever card 348 which is energized at its center tap by the voltage $+1/\sqrt{\theta_2}$ and is grounded at a tap point 350 located towards its lower end. The derived voltage at the wiper 346 is zero from the lower end of card 348 to the tap 350, increases linearly to $+1/\sqrt{\theta_2}$ from the tap 350 to the center tap, and thereafter is constant at $+1/\sqrt{\theta_2}$. The tap 350 corresponds generally to the ground idle position whereas the center tap corresponds generally to the temperature cross-over position of the power lever 22.

It is possible in the aircraft that the prop topping governor system becomes effective at a low value of fuel flow and therefore at a low r.p.m. In this case it is not desired to decrease fuel flow and r.p.m.; quite on the contrary the converse is effected. To simulate this effect a non-grounded signal is applied to the NO contact 1 of relay 334 and to the thereto connected input $-W_f(MIN.LIM.)$ provided that the fuel flow is low and the relay 334 is energized. The NC contact 1 of relay 334 is grounded so that when equilibrium is attained neither of the signals are effective. The NO contact 1 of relay 334 is connected to the wiper 352 of a $W_t$ card 354 which is grounded at its upper end and also at a tap point 356 located in the lower half of the card and is energized by the voltage $-1/\delta_2\sqrt{\theta_2}$ at its lower end.

When the fuel flow is proper the wiper 352 is located intermediate the tap 356 and the upper end of the card 354 and the voltage thereon is therefore zero. As the fuel flow drops below the minimum level corresponding to the tap point 356, a linearly increasing voltage of negative magnitude is applied through the NO contact 1 of relay 334 to the input $-\bar{W}_t$(MIN.LIM.). The effect of a non-zero signal to the NO contact 1 of relay 334 may also produce an oscillatory chain of events. Assuming that the summation of the inputs to the amplifier 340 is just zero, the thyratron 336 will fire and the relay 334 will be energized. At the same time the input signal to its NO contact 2 will also be zero. If the input to its NO contact 1 is now negative there will be an increase in fuel flow as a result of which the wiper 352 will be operated to the tap point 356, rendering the input to the amplifier 340 negative and therefore its output to the NO contact 2 of relay 334 positive tending to decrease fuel flow again. The wiper 352 is positioned to a lower point on the card 354, possibly below the tap 356 and the chain of events may be repeated. Equilibrium is finally reached when the r.p.m. assumes its scheduled value as determined by other inputs to the amplifier 222, whence the relay 334 releases.

The operation of the amplifier 222 simulates the effect of the coarse fuel flow control valve in the actual aircraft which delivers an excess of 20% over and above the proper fuel flow required for $T_5$ scheduled in accordance with the position of the power lever. In flight the fuel requirements will vary in accordance with the position of power lever 22 as reflected by the position of the wiper 312 and ultimately at the input $-\bar{W}_t$(LEV.)$_s$ and it is necessary to trim the fuel flow to just the required 100%. Whereas in the actual aircraft the fuel would physically flow from the coarse control valve through the fine control temperature datum valve, in the simulator this effect is reproduced by combining an output of the amplifier 222 with an output of a temperature datum valve (TDV) servo as inputs to the $W_t$ servo 112. The operation of the TDV servo will be described next referring to Fig. 7.

The TDV servo 358 operates between the limits of 50% and 120% of requested "corrected" or "equivalent" fuel flow ($\bar{W}_t$). It is provided with a feedback input FDBK, a usually grounded input +O.T., and an input $\pm\Delta T_5$ or $-$LIM.ANS which is supplied from either the NO contact 8 of the flight range relay 64 with a signal $\pm\Delta T_5$ or through its NC contact 8 with an answer signal, depending on the state of the relay. It will be recalled that the relay 64 is energized provided that 13,000 r.p.m. is exceeded and that the power lever is placed at or above its temperature cross-over position. These two alternate input signals represent respectively the effects of a difference in signal between scheduled and actual $T_5$ in the temperature control range on one hand, and an answer signal in the temperature limiting range on the other hand, as reflected by the energization and deenergization of the flight range relay 64. With the relay released an answer signal is supplied to the servo 358 via line 360 from a wiper 362 of a linear answer card 364 which is energized at its lower end by the reference voltage $-$E, is grounded at a point corresponding to 100% and is energized at its upper end by the reference voltage +E supplied thereto through a resistor 366.

Since the input +OT is usually grounded through the NC contact 2 of the over-temperature relay 83, the wiper 362 will be positioned at the grounded 100% point. When the overtemperature relay 83 is energized, the fixed voltage +E is applied over its NO contact 2 to the input +OT and the TDV servo will now move continuously. This will be reflected by a turbine inlet temperature indicator described hereinafter; the student pilot will then generally operate the panic handle 20 to cut-off the fuel flow, ultimately to decrease $T_5$ to normal whence the over-temperature relay 83 drops out once more, grounding the +OT input of the serve 358 once more and causing the servo to come to a stop. This chain of events is the same whether the flight range relay 64 is energized or deenergized. The combinations of circumstances for simultaneous energization of the flight range relay 64 and of the over temperature relay 83, and those of deenergization of relay 64 coupled with energization of relay 83 will be described hereinafter. When the relay 64 is energized, it appears as though the TDV servo lacks an answer signal so that it apparently operates as an integrating servo. A true integrating servo comes to a stop at and remains in the position which it attained at the time that the summation of its external input signals became zero and continues to remain thereat so long as such summation remains zero. Under the same set of facts a positioning servo would assume a final position at the ground point of its answer card. The operation of the TDV servo 358 as an integrating servo is more apparent than real; the effect of non-zero external input signals to the TDV servo is to produce a change in position, which ultimately effects a change in $T_5$, which is in turn reflected at the NO contact 8 of relay 64 ultimately to cause the TDV servo to come to a stop at its 100% position. The servo operates as a positioning servo, but its answer, instead of being supplied directly from an answer card, is supplied through a closed loop in the system including a $T_5$ servo 368 as will be apparent hereinafter.

The signal $\pm\Delta T_5$ is applied to the NO contact 8 of the flight range relay 64 from the output of a $\pm\Delta T_5$ summing amplifier 370 which simulates operation of the device comparing actual and requested $T_5$. It is provided with a feedback signal FDBK from its output, an input +K energized by the reference voltage +E to represent a scale conversion constant, an input +$T_5$ REQ representing requested $T_5$ and determined in accordance with the position of the power lever 22, and an input $-T_5$ representing actual $T_5$ as determined in accordance with the position of the $T_5$ servo 368 in simulation of thermocouples measuring actual $T_5$ in the aircraft. The arrangement is such that the summation of the three external inputs to the amplifier 370 is zero when the actual and requested $T_5$ are equal in magnitude. The signal to the input +$T_5$ REQ is derived from the wiper 372 of a linear power lever card 374 which is grounded at its lower end and also at a tap point 376, and is energized at its upper end by the reference voltage +E. The tap point 376 corresponds generally to the temperature cross-over position of the power lever 22. The zero input to amplifier 370 below this position is of no moment as the flight range relay 64 is necessarily deenergized in such case. From the tap point 376 on upward the voltage at the wiper 372 increases linearly with the power lever position. The signal to the input $-T_5$ is derived from the wiper 378 of a linear $T_5$ card 380 which is grounded at its lower end and connected to the reference voltage $-$E at its upper end. The servo 368 operates between the limits of $-70°$ C. and $+1200°$ C. and as shown is provided only with a motor but no velocity feedback generator. The motor gang operates the wiper 378 through the connections 382. The excitation of the $T_5$ servo will be discussed hereinafter.

The $-T_5$ signal on wiper 378 is also transmitted over line 384 to the NO contact 1 of the limit selector relay 80, which, as will be recalled, is energized if the power lever 22 is below its temperature cross-over position, or the r.p.m. is less than 13,000, or the electronic fuel correction switch 26 is operated to its lock position preparatory to landing (see Fig. 1 and the description pertaining thereto). With the relay energized under any of these conditions, the $-T_5$ signal is routed through its NO contact 1 to the $-T_5$ input of an over-temperature (O.T.) summing amplifier 386, which also receives additional input signals to its other two inputs, representing in effect limiting temperatures of 2150° Rankine (R.), and an incremental 350° R. for a total of 2500° R. The 2150° R. input is supplied directly by the reference voltage +E, whereas the incremental input is applied only when the r.p.m. exceeds 13,000 in which case it is fed over the NC contact 4 of relay 34. With relay 34 deenergized the incremental input is grounded through its NO contact 4. If relay 34 is energized the limit selector relay 80 will be generally energized as well (see Fig. 1). This implies in effect that if the limit selector relay 80 is energized while the 13,000 r.p.m. relay 34 is deenergized, the reason for energization of the limit selector relay 80 must be that the power lever 22 is below its temperature cross-over position or that the electronic fuel correction switch 26 is operated to its lock position preparatory to landing. When none of the conditions for energization of the relay 80 are satisfied, the input −T₅ to amplifier 386 is grounded. The amplifier 386 excites a phase sensitive rectifier 388 which in turn excites a thyratron 390 that energizes the over-temperature relay 83 provided the summation of inputs to the amplifier 386 is zero or negative. In other words the relay 83 is energized if the limit selector relay 80 is energized and T₅ is at least 2150° R. and the r.p.m. is less than 13,000, or T₅ is at least 2500° R. and the r.p.m. is above 13,000. Thus the over-temperature relay will not ever be energized if the limit selector relay is deenergized. In such case the summation of input signals to the OT amplifier 386 is necessarily positive.

The circumstances under which the OT relay 83 may be energized to apply the voltage +E to the +OT input of the TDV servo 58 may be reduced to the following:

The power lever 22 is placed below its temperature cross-over position, or the electronic fuel correction switch 26 is placed in its lock position, and, either the r.p.m. is below 13,000 and T₅ is greater than 2150° R., or the r.p.m. is at least 13,000 and T₅ is at least 2500° R.

In the above the initial "or" is conjunctive whereas the second "or" is intended to be disjunctive as it follows "either." This convention is adhered to herein throughout. The foregoing of course does not take into account the possible operation of the panic handle 20 or opening the shut-off valve generator circuit breaker 54 or other fail controls as illustrated and described with reference to Fig. 1.

The circumstances under which both the O.T. relay 83 and the flight range relay 64 are energized are:

The r.p.m. is at least 13,000, the power lever 22 is positioned to at least its temperature cross-over point, the electronic fuel correction switch 26 is positioned to its lock position and T₅ is at least 2500° R.

The circumstances under which the flight range relay 64 is deenergized whereas the OT relay 83 is energized are:

The r.p.m. is less than 13,000, T₅ is at least 2150°, and either the power lever 22 is below its temperature crossover point or it is thereabove and the switch 26 is in its lock position, or the r.p.m. is greater than 13,000, the power lever 22 is below its temperature cross-over point and T₅ is at least 2500° R.

This again assumes that the various fail switches in the energization circuits of the respective relays are in their normal positions. The control winding 392 for the TDV servo 358 is shown expressly in this instance because under certain circumstances it may be short-circuited. The effect of short-circuiting the control winding is to lock the servo in its position assumed at the time of short-circuiting until such time as the short circuit is opened once more, whence the servo again comes under control of the input signals to the servo. Closure and opening of winding 392 simulates the braking and release of a temperature datum brake in the aircraft. The winding 392 is normally connected to the servo amplifier 394 directly at its upper end, and at its lower end over line 396 and the NO contact 1 of the usually energized temperature datum brake relay 84, and thence over lines 398 and 400. When relay 84 releases the upper end of the winding 392 connects to its lower end over line 402, the NC contact 1 of relay 84 and line 396 thus short-circuiting the winding. At the same time a resistive protective load is placed across the amplifier 394 over line 402, the NC contact 1 of relay 84, line 404, resistor 406 and lines 408 and 400. The circumstances for short-circuiting of winding 392 are as follows, referring also to Fig. 1. Preparatory to landing the pilot will operate the electronic fuel correction switch 26 to its lock position thereby energizing the brake lock switch relay 66 and opening that energization circuit for the temperature datum brake relay 84 which passes through the NC contact 3 of relay 66. This will generally energize the limit selector relay 80, enabling possible operation of the over-temperature relay 83 provided the aforementioned circumstances are satisfied. The over-temperature brake lock out relay 82 will be generally deenergized prior to this time, none of the conditions for its initial energization being then generally satisfied. If in fact T₅ is then above 2500° R., relay 83 will be energized and cause the energization also of the over-temperature brake lock out relay 82 which then holds itself in through its NO contact 1 and the NO contact 2 of the now energized brake lock switch relay 66. The temperature datum brake relay 84 will therefore remain energized through that energization circuit which passes through the NO contact 3 of the over-temperature brake lock out relay 82. Continued energization of the temperature datum brake relay 84 signifies release of the temperature datum brake in the actual aircraft, leaving winding 392 non-short-circuited. Since the over-temperature relay 83 is energized as assumed, the steady signal +E will be applied to the input +O.T. of the TDV servo 358, which will then tend to run away. The pilot may operate the panic handle 20 to its panic position at this time and this will result in cut-off of fuel flow by energizing the "closed" winding 120 of the fuel cut-off relay 118 as more fully described hereinafter. The over-temperature relay 84 will release and T₅ will drop owing to the cut-off of fuel flow. This will bring the servo 358 to a stop; it will ultimately reposition itself in accordance with the new T₅. The temperature datum brake relay 84 of course must necessarily remain energized to permit such servo position. It remains indeed energized through its energization circuit including the NO contact 3 of the over-temperature brake lock out relay 82.

If at the time the electronic fuel correction switch 26 was thrown to its lock position T₅ did not exceed 2500° R., the over-temperature relay 83 will not be energized, the over-temperature brake lock out relay 82 will not be energized and cannot hold itself in. Therefore the temperature datum brake relay 84 will release, short-circuiting the control winding 392 and locking the servo 358 in position, but not before some time delay attendant to the release of the thermal time delay relay 88. If at the time of operation of the electronic fuel correction switch 26 T₅ is below 2500° R. (or 2150° R. whichever is applicable for possible energization of the OT relay 84), the relay 83 will of course not be energized, but it is possible that the over-temperature brake lock out relay 82 may be energized for alternative reasons, for example that the r.p.m. is below 13,000. In such case the over-temperature brake lock out relay 82 will hold itself in as previously described and prevent the deenergization of the temperature datum brake relay 84 and therefore of the short-circuiting of winding 392. The complete set of conditions for short-circuiting of winding 392 is somewhat complex; suffice it to state that it is necessary that the brake lock switch relay 66 be energized. Even this condition is not sufficient, as short-circuiting may nevertheless be precluded if the relay 82 is energized.

Referring to Fig. 8 for consideration of the excitation of the $W_f$ servo 112, the servo is provided with a feedback input FDBK and an answer input $-W_t$(ANS), input $+(W_t/\delta_2\sqrt{\theta_2})$ or $+\overline{W}_t$ supplied from the $\overline{W}_t$ amplifier 222 in Fig. 10, and a $+W_t$(TDV) input supplied by a signal of the same origin as the $+\overline{W}_t$ signal but modified in accordance with the operation of the TDV servo 358 to simulate the effect of the temperature datum valve on fuel flow.

The servo 112 gang operates a fuel flow indicator 410 located in the cockpit. The meter 410 is provided with an expanded scale in the region representing high fuel flow. To assure correct indication the servo's rate of change of position per unit change in fuel flow is greater in the region corresponding to low fuel flow. To this end the linear answer card 412 is grounded at its lower end, is energized by the voltage $-1/\theta_2\sqrt{\theta_2}$ at a tap point 414 corresponding to the upper limit of the lower range of fuel flow, and is energized at a second tap point 416 located towards the upper end of card 412 by the voltage $-2/\delta_2\sqrt{\theta_2}$ representing twice the voltage applied to the tap point 414. The energization of the answer card 412 by $1/\delta_2\sqrt{\theta_2}$ voltages results in division of the external inputs to the servo 112 by $1/\delta_2\sqrt{\theta_2}$. This is proper to convert from $\overline{W}_t$ to $W_t$. The manner of energization of the answer card results in the distortion of the servo shaft position proper to cause the correct reading of the indicator 410. A position of the wiper 418 at the tap point 416 represents the scale limit of the indicator 410 so that the voltage on the wiper 418 is constant at $-2/\delta_2\sqrt{\theta_2}$ from the tap point 416 to the limit of the card 412.

The answer signal is fed from the wiper 418 to the answer input over line 420; the same voltage is also applied as an input $-\overline{W}_t$ to the turbine inlet temperature computing system illustrated in Fig. 6 and described hereinafter. The input $+W_t$(TDV) receives its signal from a wiper 422 of a linear TDV card 424 which is grounded at its lower end and is connected at its upper end ultimately to the voltage $+W_t/\delta_2\sqrt{\theta_2}$ obtained at the output of the amplifier 222 in Fig. 10. The same voltage is received by the input $+(W_t/\delta_2\sqrt{\theta_2})$ which is connected to the upper end of the potentiometer 424 and also through the "available" fixed contact of an instructor's fail switch 426 which is gang-operated with the switch 140 that appears in the hold circuit of the flame relay 124 in Fig. 2. When the switch 426 is shifted to the alternate, grounded "not available" fixed contact both external inputs to the servo 112 are reduced to zero causing a run-down of the servo to its zero position.

Continuing from the "available contact," the further path to the output of amplifier 222 is over a contact 428 of the fuel cut-off valve latching relay 118 provided its "open" winding 116 is or was last energized. If the "closed" winding 120 is or was last energized both external inputs to the servo 112 are grounded causing the servo to assume its zero position. It will be recalled that prior to starting the contacts of the relay 118 were probably in alignment with the "closed" winding 120 so that the fuel flow was zero until 2200 r.p.m. was attained. Should the "open winding" 116 have been last energized prior to starting there will be a small fuel flow even before 2200 r.p.m. is attained; this is of no consequence as no flame is obtainable below 2200 r.p.m. as described previously and as will be more apparent in connection with the description of the turbine inlet temperature computing system illustrated in Fig. 6.

The $W_t$ servo supplies a signal to an input $$+W_t(\text{ENG.1})$$

of a total fuel flow computing servo 430 which receives corresponding similar signals from the $W_t$ servos of the other engine systems at its like-named inputs with the numerals 2, 3 and 4 substituted for 1. The servo 430 operates between the limits of 0 and 24,000 lbs. per hour and gang-operates a total fuel flow indicator 432 which has a uniform linear scale. Since the position of the servo 112 is "distorted" (to provide correct deflection for the indicator 410), it is necessary to correct for this distortion in the operation of the servo 430 and meter 432.

To this end the input $W_f$(ENG.1) is connected to the wiper 434 of a linear $W_t$ card 436 that is grounded at its lower end and is energized at tap points 438 and 440 by the reference voltages $+E$ and $+2E$ respectively. The locations of the tap points 438 and 440 correspond respectively to those of the tap points 414 and 416. The servo 430 derives its feedback signal from an output of the servo amplifier 442 and is therefore not provided with a velocity feedback generator. The servo also obtains an answer signal from the wiper 444 of a linear answer card 446 that is connected at its lower and upper ends to ground and to the voltage $-E$ respectively.

Referring to Fig. 6 for the consideration of the turbine inlet temperature computing system, the system includes a "corrected" turbine inlet temperature ($T_5/\theta_2$) servo 448 which computes $T_5/\theta_2$ principally according to the summation of a function of $N/\sqrt{\theta_2}$ and another function of $N/\sqrt{\theta_2}$ multiplied by $\overline{W}_t$. The functions are in accordance with the performance of the actual aircraft and are generated by proper potentiometer contour as described hereinafter. The external input signals to the servo are inherently negative and a more highly negative signal is effective to produce increased $T_5/\theta_2$. The variables $T_5/\theta_2$, $N/\sqrt{\theta_2}$ will also be referred to as $\overline{T}_5$ and $\overline{N}$.

The servo operates between the indicated limits of 365° R. and 3400° R. and gang-operates the wiper 450 of a linear answer card 452 which is connected at its upper end to the reference voltage $+E$ and at its lower end to ground through a resistor 454. The wiper voltage is applied to the $+$ANS input of the servo over line 456 and is also applied as the sole external input signal to the $T_5$ servo 368. The servo 448 is also provided with the usual feedback signal to its input FDBK. The principal external input signals to the servo 448 are applied to the inputs $-\overline{T}_5(\overline{W}_t, \overline{N})$ and $-\overline{T}_5(\overline{N})$. The latter signal is derived from the wiper 458 of an $\overline{N}$ potentiometer 460 which is energized at its upper end by the voltage $-E$, and is grounded at its lower end and also at a tap point 466 corresponding to about 3500 equivalent r.p.m. The potentiometer 460 is of approximately parabolic contour upward of the tap point 466. The effect of the energization and connections of the card 460 is to produce at the wiper 458 zero volts from the lower end to the tap point 466, and thence a parabolically decreasing voltage between the tap point 466 and the upper end of the potentiometer. The voltage of wiper 458 is also applied to an input $-\Delta\overline{T}_5(\overline{N})$ over the NC contact 5 of relay 34 provided that the r.p.m. exceeds 13,000. For an r.p.m. below 13,000 this input is grounded through the NO contact 5 of relay 34. The operation of the relay reflects an increase in temperature at and above 13,000 r.p.m. due to the opening of air bleed valves.

The input $-\overline{T}_5(\overline{W}_t, \overline{N})$ receives its input signal from the wiper 467 of $\overline{N}$ card 468 which comprises a short-circuited conductor portion as represented by the hatched portion 470 which occupies in excess of 60% of the card 468. The remaining upper portion is contoured approximately hyperbolically; the upper end of the card is connected through a resistor 472 to ground. The card 468 is energized by the $-\overline{W}_t$ voltage obtained at the wiper 418 in Fig. 8, which voltage is applied to the conductor portion 470 through the NO contact 2 of the flame relay 124 when this relay is energized at 2200 r.p.m. Prior to such energization below 2200 r.p.m. the portion 470 is grounded through the NC contact 2 of the relay. The effect of the manner of connection and energization of the potentiometer 468 is to provide the constant signal $-\overline{W}_t$ at the wiper 467 with increasing $\overline{N}$ until the wiper leaves the portion 470 and thereafter to effect an approximately hyperbolic increase approaching but not reaching zero volts. The wiper voltage is also fed to an input $-\Delta \bar{T}_5(\bar{W}_5, \bar{N})$ over the NO contact 6 of relay 34 provided this relay is energized. At 13,000 r.p.m. this input is grounded through the NC contact 6 of relay 34. Such grounding off-sets in part only the incremental signal to the input $-\Delta \bar{T}_5(\bar{N})$ at 13,000 r.p.m., so that the net effect of the opening of the air bleed valves is to produce an increase in temperature.

Prior to the initiation of the starting operation the flame relay 124 is released, necessarily grounding the inputs $-\bar{T}_5(\bar{W}_f, \bar{N})$ and $-\Delta \bar{T}_5(\bar{W}_f, \bar{N})$ and also an input —ATM BL as will be seen hereinafter. Also the wiper 458 is at the bottom of card 460 grounding the input $-\bar{T}_5(\bar{N})$ whereas the input $-\Delta \bar{T}_5(\bar{N})$ is grounded through the NO contact 5 of the then energized 13,000 r.p.m. relay 34. As a result the answer card wiper 450 will seek to find a ground point; however there is a minimum positive voltage at the bottom of card 452 at which any further servo rotation is blocked by means of limit stops. These conditions continue until 2200 r.p.m. is reached subsequent to the starting operation, at which time the flame relay 124 is energized and the $-\bar{W}_f$ signal is transmitted to the card 468. The wiper 467 is then still engaging the conducting portion 470 so that the full $-\bar{W}_f$ signal is transmitted to both inputs $-\bar{T}_5(\bar{W}_f, \bar{N})$ and $-\Delta \bar{T}_5(\bar{W}_f, \bar{N})$. At the same time wiper 458 is still below the tap point 466 so that the input $-\bar{T}_5(\bar{N})$ is still supplied by zero volts. The servo 448 accordingly will position itself according to $\bar{N}.\bar{W}_f$. At about 3500 r.p.m. the wiper 458 passes the tap 466 so that from hereon in the increase in $\bar{T}_5$ is more rapid owing to the added non-zero signal to the input $-\bar{T}_5(\bar{N})$. At approximately the crossover from temperature limiting to temperature control, i.e. at approximately a 12,500 r.p.m. point, the wiper 467 leaves the conductor portion 470 and thereafter $T_5$ drops in accordance with the further position of the wiper 467. Although the signal to the input $-\bar{T}_5(\bar{N})$ continues to increase with increasing $\bar{N}$ tending further to increase $\bar{T}_5$, $\bar{W}_f$ drops at the same time and the net effect is to initiate a decreasing trend in $T_5$ with further increase in r.p.m. At 13,000 r.p.m. the relay 34 releases grounding the input $$-\Delta \bar{T}_5(\bar{W}_f, \bar{N})$$

and returning the input $-\Delta \bar{T}_5(\bar{N})$ to the wiper 458. This increases $\bar{T}_5$ as explained; however with a further r.p.m. increase the decreasing trend continues until $\bar{T}_5$ levels off in the temperature control region.

In addition to the air bleed effects taking place at 13,000 r.p.m. certain other air bleed effects may be introduced further to increase $\bar{T}_5$. To this end the movable contact 2 of the flame relay 124 is connected also over line 474 to a tap point 476 of a further $\bar{N}$ card 478 which is returned from a tap point 480 and also from its upper end through a resistor 482 to ground. The contour of the card 478 is approximately parabolic between the taps 476 and 480. As a result of the manner of energization and connection of the card the derived voltage at its wiper 484 is, with increasing $\bar{N}$, constant at $-\bar{W}_f$ up to the tap point 476, increases approximately parabolically and tending towards but not reaching zero up to the tap point 480, and remains level thereafter. The wiper 484 supplies several air bleed inputs to the servo 448 of which only one, namely the air turbine motor bleed input is shown. The servo may be provided with additional inputs representing the effect on $\bar{T}_5$ of air bleeding for deicing and anti-icing purposes, to the cargo compartment to the flight deck, etc. Such inputs are connected to or alternately disconnected from the wiper 484 in a manner analgous to that of the input —ATM BL with appropriate relays replacing the air turbine motor bleed relay 486. The wiper 484 is connected through the NO contact 1 of relay 486 to the —ATM BL input provided that the relay is energized to represent bleeding of air to the air turbine motor. Release of the relay signifies closure of the bleed valve in which case the input is grounded through the NC contact 1.

The $\bar{T}_5$ servo controls in part the operation of a shaft horsepower computing system illustrated in Fig. 4 and described hereinafter. It also supplies the principal input signal to the $T_5$ servo 368 as previously explained. The servo 368 is provided with an answer input —ANS and a feedback input FDBK which is energized from an output of the servo amplifier so that the usual velocity feedback generator is omitted. The —ANS input is supplied with an answer signal from the wiper 488 of a linear answer potentiometer 490 which is connected at its upper end to the voltage $-1/\theta_2$ to effect division of the $\bar{T}_5$ signal by $1/\theta_2$, thus converting "corrected" temperature to actual temperature. The potentiometer is returned to ground from its lower end through a resistor 492. The servo also gang-operates a turbine inlet temperature indicator 494 located in the cockpit. The $T_5$ servo is also effective to supply the temperature datum valve system with a signal representing actual $T_5$ as explained in connection with the description of Fig. 7.

Figure 4:
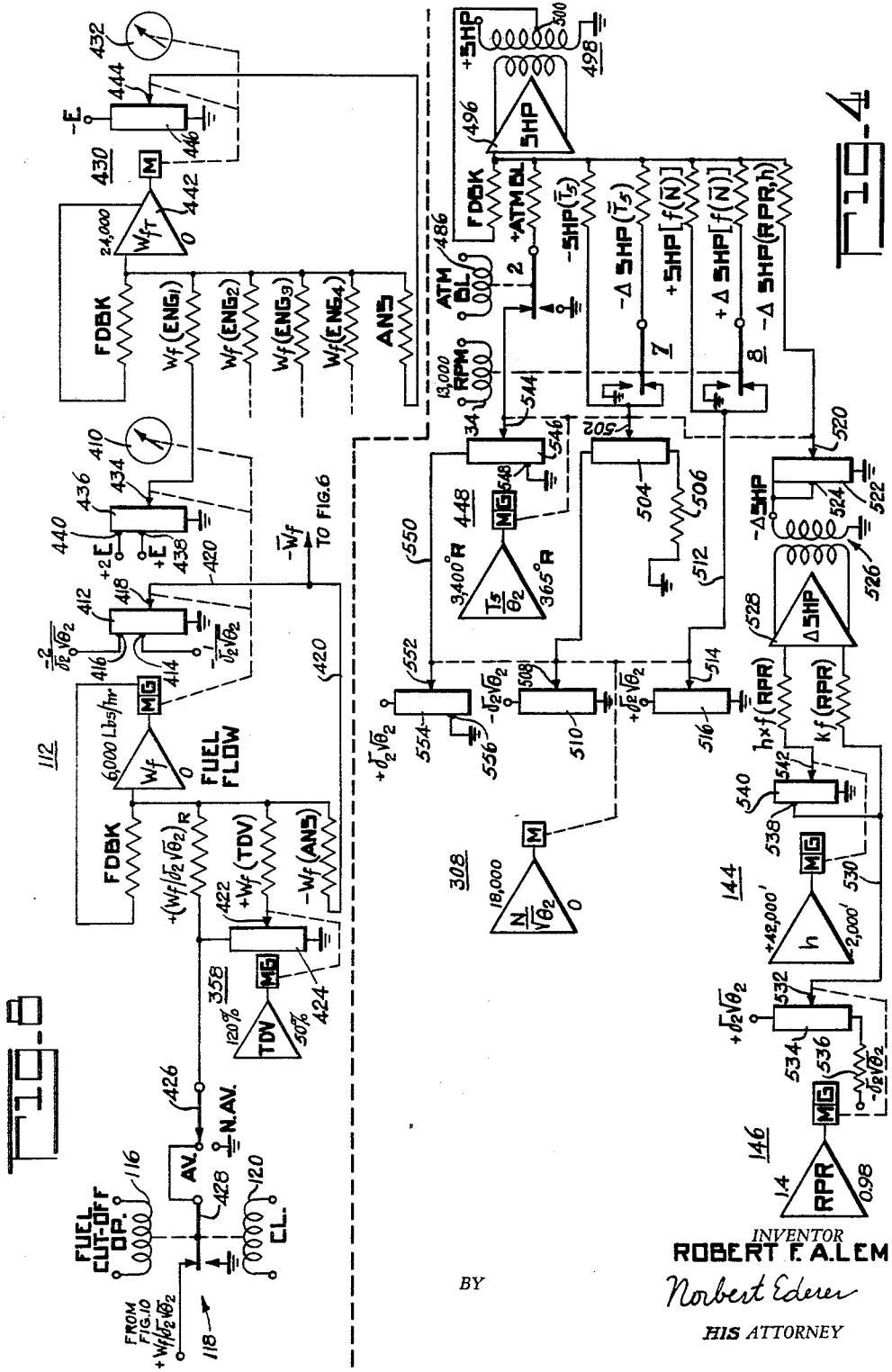
Fig. 4 is a schematic drawing of means for computing shaft horsepower constituting another part of the simulating apparatus.

Referring to Fig. 4 for consideration of the shaft horsepower computing system, the system includes a shaft horse power (SHP) summing amplifier 496 which computes shaft horse power according to principally the summation of two functions each multiplied by $\delta_2\sqrt{\theta_2}$ and to a somewhat lesser degree a third function of sea level altitude $(h)$, RPR, $\bar{T}_5$ and $\delta_2\sqrt{\delta_2}$. The three corresponding inputs are $-SHP(\bar{T}_5)$, $+SHP[f(\bar{N})]$ and $$-\Delta SHP(RPR, h)$$

The first function is a product of $\bar{T}_5$ and a further function of $\bar{N}$, whereas the second function is a function merely of $\bar{N}$. All of the functions are based on the performance of the actual aircraft and are generated by suitably contoured potentiometers as described hereinafter. The output of amplifier 496 is applied to the primary of a transformer 498 whose secondary has a lower grounded end and from whose upper end the voltage +SHP is available. This voltage is fed as a principal external input signal to the torque computing system illustrated in Fig. 3 and described in greater detail hereinafter. A feedback voltage is derived from a tap point 500 located intermediate of the end points of the secondary of transformer 498 and is applied to the input FDBK of amplifier 496. The amplifier 496 is arranged so that an increasingly negative input signal represents increased shaft horse power.

The input $-SHP(\bar{T}_5)$ is derived from the wiper 502 of a linear $\bar{T}_5$ card 504 whose lower end is returned to ground through a resistor 506 and whose upper end is energized by a voltage representing $\delta_2\sqrt{\theta_2}x-f(\bar{T}_5)$. This voltage is in turn derived from the wiper 508 of an $\bar{N}$ card 510 which is grounded at its lower end, is energized by the voltage $-\delta_2\sqrt{\theta_2}$ at its upper end and is contoured to produce $f(\bar{N})$, which is generally in the shape of a bow curve that increases monotonically with $\bar{N}$. Above 13,000 r.p.m. the voltage derived at the wiper 502 is also applied to an input $-\Delta SHP(\bar{T}_5)$ through the NC contact 7 of the relay 34, to produce above 13,000 r.p.m. an incremental increase in shaft horse power with increasing r.p.m. and $T_5$, characteristic of the actual aircraft. The input is grounded below 13,000 r.p.m. through the NO contact 7 of relay 34.

The input $+SHPf(\bar{N})$ derives its input signal via line 512 from the wiper 514 of another $\bar{N}$ card 516 that is grounded at its lower end and is energized at its upper end by the voltage $+\delta_2\sqrt{\theta_2}$. Card 516 is contoured for generation of a slightly non-linear function. Above 13,000 r.p.m. the voltage derived from the wiper 514 is applied also to the input $+\Delta SHP[f(\bar{N})]$ through the NC contact 8 of relay 34 and as such off-sets partially the effect of increase in shaft horse power due to application of the signal voltage to the input $-\Delta SHP(\bar{T}_5)$. Below 13,000 r.p.m. the input $+\Delta SHP[f(\bar{N})]$ is grounded through the NO contact 8 of relay 34. So long as $T_5$ is building up to or remaining at normal value, the input voltages derived from the wipers 508 and 502 will prevail over the input voltages derived from the wiper 514. If $T_5$ drops, for example by reason of loss of flame, the positive signals derived from the wiper 514 will prevail to produce negative shaft horse power attendant to wind-milling.

The input $-\Delta SHP(RPR, h)$ is supplied by a signal derived from the wiper 520 of a further $\bar{T}_5$ card 522 that is grounded at its lower end and is energized at its upper end and at an intermediate tap point 524 by a voltage $-\Delta SHP$ which is computed as a function of $h$, RPR and $\delta_2\sqrt{\theta_2}$. The card 522 is contoured for generation of an approximately parabolically varying voltage from its grounded end to the tap point 524 above which the wiper voltage remains constant at the full $-\Delta SHP$ value. This voltage is obtained from the upper end of the secondary of a transformer 526, the lower end of the secondary being grounded. The primary of the transformer is connected across the output of a $\Delta SHP$ amplifier 528 that is provided with two inputs $kf(RPR)$ and a second input $h \times f$ (RPR). These inputs receive signals representing respectively the effect on shaft horse power of a function of RPR and of sea level altitude multiplied by the same function. The former input is derived via line 530 from the wiper 532 of an RPR card 534 that is contoured to produce the somewhat non-linear response required and is energized at its upper end by the voltage $+\delta_2\sqrt{\theta_2}$ and its lower end by the voltage $-\delta_2\sqrt{\theta_2}$ applied through a resistor 536. The voltage derived at the wiper 532 is also applied to a tap point 538 located in the upper portion of a linear $h$ card 540 whose lower end is grounded and whose wiper 542 supplies the signal to the input $h \times f$ (RPR) of the amplifier 528. Accordingly the derived voltage at the wiper 542 increases linearly to the tap point 538 and remains constant thereafter at the value of the voltage on the wiper 532.

Bleeding of air from the compressor tends to decrease shaft horse power and these effects are included by provision of several "bleed" inputs to the amplifier 496 of which the input $+ATM\ BL$ is typical. Similar inputs may be provided to represent the effects of bleeding for deicing and anti-icing purposes, to the cargo compartment, the flight deck, etc. much in the same manner as in the case of the inputs to the $\bar{T}_5$ servo 448. The input $+ATM\ BL$ is derived through the NO contact 2 of the relay 486 provided this relay is energized to represent bleeding of air to the air turbine motor. When air is not bled thereto the relay is deenergized to ground the input through its NC contact 2. In the case of other "bleed" inputs the relay 486 is replaced or supplemented by corresponding relays as in the case of the inputs to the $\bar{T}_5$ servo 448. The NO contact 2 of relay 486 is supplied by a signal derived at the wiper 544 of a $\bar{T}_5$ card 546. The corresponding contacts of other "bleed" relays also derive their respective signals from the wiper 544. The card 546 is grounded at a tap point 548 located in the lower portion of the card to produce 0 volt up to such tap point, and is contoured to produce an approximately parabolic response up to its upper end which is connected over line 550 to the wiper 552 of an $\bar{N}$ card 554. Card 554 is grounded at a tap point 556 located in the lower portion of the card to deliver 0 volt to the wiper 552 up to such tap point, and is contoured for generation of a somewhat non-linear function up to its upper end, which is energized by the voltage $+\delta_2\sqrt{\theta_2}$.

Figure 3:
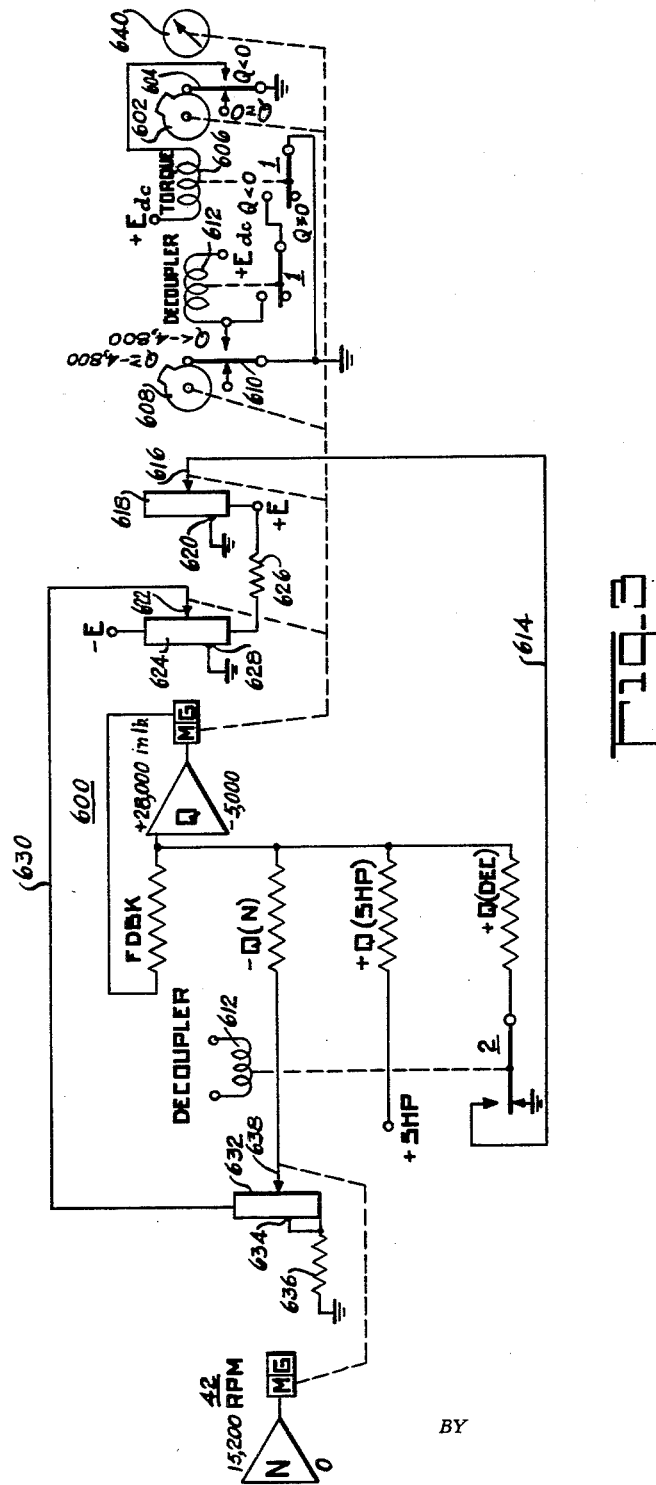
Fig. 3 is a schematic drawing of a torque (Q) servo system forming a part of the simulating apparatus.

The $+SHP$ signal is the principal signal controlling the operation of a torque (Q) servo 600 illustrated in Fig. 3 and is applied to the $+Q(SHP)$ input thereof. The servo operates between the indicated limits of $-5000$ and $+28,000$ inch-pounds. Positive torque signifies that the turbine is driving the propeller whereas the converse is true during windmilling for negative torque. The servo gang-operates a cam 602 which positions a movable contact 604 to engagement alternately of $Q \geq 0$ and $Q < 0$ fixed contacts according to whether the computed torque is at least zero or less than zero. The contact 604 is electrically grounded to connect, when engaging the $Q < 0$ contact, to one end of a torque relay 606 thereby to complete an energization circuit therefor. The other end of the relay is connected to the D.C. voltage $+E_{dc}$.

The servo also gang-operates a second cam 608 which operates a movable contact 610 that engages alternately $Q \geq -4800$ and $Q < -4800$ fixed contacts depending on whether the torque is at least $-4800$ inch-pounds or less than $-4800$ inch-pounds. The contact 610 which is electrically grounded completes, when engaging the $$Q < -4800$$

contact, an energization circuit for a decoupler relay 612 whose ends are connected to the voltage $+E_{dc}$ and the $$Q < -4800$$

contact. With Q less than $-4800$ inch-pounds the torque relay 606 will be necessarily energized in which case a hold circuit is established for the decoupler relay 612 through its NO contact 1 and the grounded NO contact 1 of the torque relay. This simulates the decoupling of turbine and propeller in the actual aircraft below $-4800$ r.p.m. The input $+Q(DEC)$ to the servo 600 is usually grounded through the NC contact 2 of the decoupler relay 612, but upon energization thereof an answer signal is supplied thereto through the associated NO contact 2. The answer signal is derived over line 614 from the wiper 616 of a linear answer card 618 that is connected at its lower end to the voltage $+E$ and is grounded at a tap point 620 corresponding to zero torque. When the torque is just at $-4800$ inch-pounds the wiper 616 will assume its corresponding position intermediate the lower end of card 618 and the tap point 620 and will derive an inherently positive voltage. When the torque drops below $-4800$, the decoupler relay 612 will be energized and will hold itself in as described and transmit an even more positive voltage from the wiper 616 to the input $+Q(DEC)$ tending to position the servo towards positive torque. At $-4800$ inch-pounds the original energization circuit for the relay 612 will open but the relay will remain energized through its hold circuit. As a result the servo moves to its zero position in which the wiper 616 engages the tap 620 at which time the torque relay 606 drops out and as a consequence the decoupler relay 612 also drops out. In the actual aircraft the propeller will be initially decoupled at a torque just less than $-4800$ inch-pounds and will remain decoupled until the torque is restored to zero. Such restoration will occur as a direct consequence of the initial decoupling. Thus it is seen that the simulating apparatus duplicates the aircraft operation. The circumstances under which the torque might drop below $-4800$ inch-pounds are explained in the aforementioned Goodwin application.

The servo is provided with the usual velocity feedback signal applied to its FDBK input; it computes torque as the quotient of shaft horsepower and r.p.m. The division by r.p.m. is accomplished by deriving an answer type Q signal, multiplying it by r.p.m. and applying it as multiplied to the input $-Q(N)$. The Q signal is derived from the wiper 622 of a linear answer card 624 that is energized at its upper end by the voltage $-E$ and at its lower end by the voltage $+E$ supplied thereto through a resistor 626. The card is grounded at a tap point 628 corresponding to zero torque. The Q signal is fed from the wiper 622 over line 630 to the upper end of a linear N card 632. Its lower end, and also a tap point 634 located in the lower portion of card 632, are returned to ground through a resistor 636. This arrangement avoids division by zero or near zero r.p.m. The wiper 638 of card 632 is connected to the input —Q(N).

The Q servo gang-operates also a torque indicator 640 in the cockpit and is effective in part to control the operation of the N servo 42 as illustrated and described in the aforesaid Goodwin application.

With the description of the structure of the simulating apparatus thus completed the description of its operation will now be resumed. Referring to Fig. 10, it will be recalled that the build-up of regulator fuel flow was terminated when the acceleration fuel flow schedule matched the steady state fuel schedule as reflected by the energization of the PTO relay 230 at approximately 12,500 r.p.m. At this time the power lever 22 (Fig. 9) is assumed to be still in the ground idle position in the Beta range in the case of a ground start or in the flight idle position in case of an air start, i.e. below its temperature cross-over position. The flight range relay 64 is accordingly still deenergized so that the TDV servo 358 is in its zero position reflecting 100% fuel flow. The fuel flow decreases consequently as reflected by the back-tracking of the $W_f$ servo (Figs. 8 and 10). Accordingly $T_5$ will also drop somewhat as reflected by the back-tracking of the servo 448 and 368 in Fig. 6. Accordingly the computed shaft horsepower (Fig. 4) also drops and the computed torque (Fig. 3) also drops somewhat. Stabilization is achieved due to the action of the prop topping governor system (Fig. 10) as reflected by one or more cycles of energization and deenergization of the relay 334. This is in turn reflected by stabilization in fuel flow, $T_5$, shaft horsepower, torque and r.p.m. The effect of torque on r.p.m. is described in the aforementioned Goodwin application.

The r.p.m. in the case of a ground start will settle at approximately 13,400 for which the prop topping governor is set; in the case of an air start the electronic governor system described in the Goodwin application will bring the speed up to approximately 13,800 r.p.m. In either event 13,000 r.p.m. is passed whence the relay 34 is deenergized to simulate opening of the bleed valves. This tends to increase $T_5$ (Fig. 6) but at the same time tends to decrease shaft horsepower (Fig. 4), as previously discussed so that the net effect on shaft horsepower and torque is a small decrease. The increase in $T_5$ will be reflected in an increased indication of the instrument 494 (Fig. 6).

In the case of a ground start the pilot will next position the power lever to its take-off position. In the case of an air start he had shifted the condition lever 24 (Fig. 2) from the air start to its normal position as soon as he had observed an indication of initial build-up of $T_5$ on the meter 494. He will next also position the power lever past the temperature cross-over position. In either case the flight range relay 64 will pick up and the r.p.m. will be held at the electronic governor speed of 13,800. The power requirement will be determined by the actual propeller load as described in the aforementioned Goodwin application, and the fuel flow, and consequently $T_5$, the shaft horsepower and torque required to match such propeller load will be adjusted in accordance with the position of the power lever 22 as reflected now by the wiper 312 of the potentiometer 314 instead of the wiper 284 of the potentiometer 286 (Fig. 9) in view of the energization of the flight range relay 64. The power lever now exercises a control effect also on the temperature datum valve system (Fig. 7) through the agency of the wiper 372 of potentiometer 374; this is determinative of the requested $T_5$; this signal is compared with the actual $T_5$ as reflected at the wiper 378 of potentiometer 380. The resultant error signal controls the TDV servo 358, which in turn controls the $W_f$ servo 112 (Fig. 8), which in turn controls the $\bar{T}_5$ servo 448 and the $T_5$ servo 368 (Fig. 6), which in turn tends to restore the error signal to the TDV servo 358 (Fig. 7) to zero, thus completing the feedback loop and limiting the fuel flow, $T_5$, and consequently also the shaft horsepower and torque to the scheduled values.

While in flight the power lever 22 is positioned according to the require propeller load requirements and thus continues to control the fuel flow, $T_5$, shaft horsepower and torque due to its control of the wiper 312 of potentiometer 314 (Fig. 9) and of the wiper 372 of potentiometer 374 (Fig. 7).

If during flight there occurs malfunctioning in the engine system or the prop system as reflected by abnormal indications of the various flight instruments for example, the pilot may position the panic handle 20 (Fig. 2) to its panic position. In either case the "closed" winding 120 of the fuel cut-off relay 118 will be energized and its "open" winding 116 will be deenergized. In either case also the reenergization of the ignition relay 114 and of the fuel enrichment relay 92 is precluded; the reenergization of the fuel enrichment valve relay 122 is necessarily precluded; the original energization circuit for the flame relay 124 is opened doubly because of the deenergization of the "open" winding 116 and the deenergization of the fuel enrichment valve relay 122, and its hold circuit is also opened owing to the energization of the "closed" winding 120.

Accordingly the flame is extinguished and the various systems will run down. The several servos will run back towards their initial positions they had prior to starting. That this is so may be seen by reference to Fig. 8 and then to Fig. 6. The energization of the "closed" winding 120 results in zero signal to the external inputs to the $W_f$ servo 112 (Fig. 8) causing it to run down practically instantly. This of itself would tend to cause a run down of the $\bar{T}_5$ and $T_5$ servos (Fig. 6) but such run down is further insured owing to the grounding of the input $-\bar{T}_5(\bar{W}_f, \bar{N})$ through the NC contact 2 of the now deenergized flame relay 124. The run down is not instant however in view of the slow run down of r.p.m. as reflected by the position of the wiper 458 which is connected to the input $-\bar{T}_5(\bar{N})$.

Referring now to Fig. 4, the run down of the $\bar{T}_5$ servo 448 minimizes the magnitude of the input signal to the input $-SHP(\bar{T}_5)$ so that the signal to the input $$+SHP[(f)\bar{N}]$$

will prevail and will ultimately produce negative shaft horsepower. Referring now to Fig. 3 this in turn will cause the torque servo 600 to run down into the negative torque range. Ultimately the N servo 42 will also run down as described in the aforementioned Goodwin application and cause the $\bar{T}_5$ and $T_5$ servos to run to their initial positions and also the SHP and Q systems to revert to zero. The run down characteristics are not retraces of the build-up characteristics and as such do not involve steady state and acceleration schedules; rather they are more direct as the intermediate effects occurring at 9000 r.p.m. and 2200 r.p.m. are precluded owing to the instant run down of the $W_f$ servo 112 and the preclusion of the energization of the various relays in Fig. 2, other than the "closed" winding 120 of the fuel cut-off relay. When the system run down is complete, the student pilot may attempt another air start by repositioning the panic handle 20 to its normal position, the condition lever 24 to its air start position, and the power lever 22 to its flight idle position; however the various conditions precedent for an air start as described in connection with the description of Fig. 2 may not be satisfied, in which case he must depend on the remaining three engines until such time as the conditions are satisfied.

Preparatory to landing, the pilot will place the electronic fuel correction switch 26 (Fig. 1) in its lock position, thereby energizing the limit selector relay 80. This effects, referring to Fig. 7, transfer of the $-T_5$ input of the OT amplifier 386 from ground to the $T_5$ wiper 378. Since $T_5$ at this time is at a lower steady state value rather than a higher acceleration value, it will be necessarily below 2500° R. and for that matter below 2150° R., so that the over temperature relay 83 will remain deenergized. Referring again to Fig. 1, prior to the shifting of the switch 26, the over-temperature brake lock out relay 82 had been in its usual deenergized state and remains therein for the very reason that the OT relay 83 remains deenergized and that the brake lock switch relay 66 is energized. The states of these two relays preclude possible energization of the relay 82 through the path including respectively the NO contact 1 of relay 83 and the NC contact 2 of relay 66, the energization through the NO contact 3 of relay 34 still being precluded with the r.p.m. still above 13,000. Energization of the temperature datum brake relay 84 through the NO contact 3 of relay 82 is therefore precluded, and since its energization path including the NC contact 3 of relay 66 is now also opened, the relay 84 releases. Referring again to Fig. 7 such release short-circuits the winding 392 of the TDV servo 358 and thus removes henceforth the control effect of the power lever 22 as exercised through the agency of the wiper 372. The wiper 362 will remain locked in the position assumed by the TDV servo 358 just prior to the operation of the switch 26, generally the 100% position.

Upon touch down the pilot will position the power lever 22 initially to its reverse position, thereafter to its taxi position for taxiing, and ultimately to its ground idle position upon stopping. This results, referring to Fig. 1, in the deenergization of the power lever relay 58 and also the flight range relay 64. Under these circumstances $T_5$ will generally still be below 2150° R. so that the OT relay 83 (Fig. 7) will still be deenergized and consequently the $+$OT input to the servo 358 will remain grounded. Referring again to Fig. 1 with the OT relay still deenergized, even though the power lever relay 58 is now deenergized, the relay 82 remains deenergized since that original energization circuit, which includes the NO contact 3 of relay 58, is opened due to the continued energization of the brake lock switch relay 66. Consequently the temperature datum brake relay 84 remains deenergized and the TDV servo 358 locked.

The pilot will next operate the condition lever 24 (Fig. 2) to its ground stop position, and with the H relay 130 now energized to represent the on ground condition, the same chain of events will ensue as did in the case of its operation to the feather position or the operation of the panic handle 20. Additionally however as the r.p.m. drops below 13,000, the relay 82 will now be energized through that original energization circuit which includes the NO contact 3 of relay 34. This reenergizes the temperature datum brake relay 84 through the NO contact 3 of relay 82 and, referring to Fig. 7, opens the short circuit for the winding 392. At the time of deenergization of the flight range relay 64 the answer input to the TDV servo 358 was reapplied through the NC contact 8 of the relay, so that when the short-circuit is opened the servo will answer itself to its zero position corresponding to 100%. As $T_5$ is dropping steadily the over-temperature relay 83 will remain deenergized so that the servo 358 will not tend to run away as a general proposition. It is thus seen that the relay 83 generally remains deenergized throughout and is intended merely as a safety device.

The effect of operation of the various circuit breakers and fail switches will now be explained. Referring to Fig. 1 the operation of the shut-off valve generator circuit breaker 54 will result in the deenergization of the relay 34 provided the turbine is less than 13,000 r.p.m. prior thereto. This is of significance primarily during the starting operation and to a more limited extent during a run down. Referring to Fig. 7 the effect of such deenergizaion is to transfer the over-temperature limit from 2150° R. to 2500° R. Referring to Fig. 6 it is seen that the operation of the $T_5$ and $T_5$ servos are modified owing to the shift of the movable contacts 5 and 6 of relay 34 attendant to is deenergization. This induces during acceleration the change in characteristics attendant to the opening of the bleed valves, but below 13,000 r.p.m. it is of practically no significance on run down in view of the grounding of the input $-\Delta \bar{T}_5(\bar{W}_f, \bar{N})$ in any event. The same considerations prevail with respect to the operations of the shaft horsepower computing system in Fig. 4. During acceleration the bleed effects will be induced prematurely (i.e. below 13,000 r.p.m.) by reason of the shifting of the movable contacts 7 and 8 of the relay 34. During run down the decrease to a negative shaft horsepower and thereafter reversion to positive shaft horsepower is modified as though the bleed valve had remained open throughout.

Referring again to Fig. 1 shifting of the switch 70 to its "not available" position will necessarily preclude energization of the brake lock switch relay 66. If the flight station bus tie switch 72 and the circuit breaker 76 remain in their normal conditions, operation of the electronic fuel correction switch 26 to its lock position is of no moment so that the temperature datum brake relay 84 will not be deenergized subsequent to operation of switch 26 and the winding 392 of the TDV servo (Fig. 7) will not be short-circuited. If on the other hand the flight station bus tie switch 72 or the circuit breaker 76 are operated, the relays 80, 82, and 84 will be necessarily deenergized, the relay 83 (Fig. 7) will remain necessarily deenergized and the winding 392 will be short-circuited irrespective of the position of the power lever 22. The relay 84 may also be deenergized with the same results by operation of the switch 86 (Fig. 1).

Referring to Fig. 2, operation of the switch 70 to its "not available position" will additionally result necessarily in the deenergization of both the "open" winding 116 and the "closed" winding 120 of the relay 118, and also necessarily in the deenergization of the ignition relay 114, of the fuel enrichment relay 92, and of the fuel enrichment valve relay 122. If this happens prior to starting it is readily seen that the flame relay 124 cannot be energized and therefore proper starting is precluded. If on the other hand this happens while operating in the steady state condition, the flame relay 124 will remain held in owing to the memory properties of the relay 118. Accordingly the apparatus will continue to function correctly as may be seen with reference to Fig. 8 and Fig. 6 wherein the relays 118 and 124 are effective. If the switch 70 is operated during run down there are no further consequences. The flame relay 124 will be deenergized in any event and the relay 118 will remain in alignment with the "closed" winding 120 because of its memory properties. Referring again to Fig. 2, inasmuch as the circuit breaker 94 is in series with the switch 70, operation of the former will produce the same effect as operation of the latter.

Operation of the flight station bus tie switch 72 to its "not available position," the effects of which have been discussed in part hereinabove with reference to Fig. 1, will also preclude the energization of the fuel enrichment valve relay 122. Since the energization circuit of the relay 122 includes the switch 72 in series with the movable contact 1 of the fuel enrichment relay 82, it will be seen referring to the immediately preceding paragraph, that such operation will also preclude a proper start since the flame relay 124 cannot be energized, but will be of no further effect during steady state conditions or during run down. The same results are obtained if the start control circuit breaker 126 is operated or the fuel enrichment switch 28 is operated to its off position. Operation of the fail switch 136 to its fail position or energization of the relay 138 in simulation of a bad landing crash will necessarily deenergize the flame relay 124; if this happens during the starting operation, a proper start will again be precluded, but if it happens during run down it is of no further effect owing to the memory properties of the relay 118. If it happens during steady state operation the flame relay 124 will release, and, referring to Fig. 6, the input $-\bar{T}_5(W_f, \bar{N})$ will be grounded as a consequence. Accordingly $T_5$ will drop and, referring to Fig. 4, the input $-SHP(\bar{T}_5)$ will also drop and as a result the shaft horsepower and torque will become negative as in the case of run down. Referring to Figs. 7 and 8, the drop in $T_5$ will, provided the flight range relay 64 continues to remain energized, adjust the TDV servo 358 which in turn will diminish the fuel flow so that the $W_f$ servo 112 will also run down.

Referring to Fig. 2, operation of the switch 140 to its "not available" position will open the hold circuit for the flame relay 124 thus extinguishing the flame. This, referring to Fig. 8, will also ground the external inputs to the $W_f$ servo 112 through the "not available" contact of the switch 426 gang-operated with the switch 140. The results will then be the same as the operation of the switch 136 to its fail position, except that in the present instance the $W_f$ servo 112 will run down completely and practically instantly and will therefore produce the same effect as operation of the panic handle 20.

It should be understood that the aforegoing description is intended to be illustrative of the invention and not as a limitation thereof, reference being had to the appended claims for determining the scope of the invention.

What is claimed is:

1. In grounded aircraft training apparatus for simulating the operation of turbo-propeller aircraft including means for computing simulated turbine r.p.m., apparatus for simulating the turbine system of said aircraft comprising a simulated power lever, means providing a variable signal as a function of the position of said power lever, computing means receiving said signal as an input signal and providing an output signal representing simulated fuel flow, computing means receiving as an input signal said fuel flow output signal and in turn providing an output signal representing simulated turbine inlet temperature, and computing means receiving as an input signal said temperature output signal for computing simulated turbine shaft horsepower, the computed horsepower value being utilizable as a factor determinative of the turbine r.p.m. as computed by said r.p.m. computing means.

2. In grounded aircraft training apparatus for simulating the operation of turbo-propeller aircraft including means for computing simulated turbine r.p.m., apparatus for simulating the turbine system of said aircraft comprising a simulated power lever, means providing a variable signal as a joint function of the position of said power lever and the turbine r.p.m. as computed by said r.p.m. computing means, computing means receiving said signal as an input signal and providing an output signal representing simulated fuel flow, computing means receiving as an input signal said fuel flow output signal and in turn providing an output signal representing simulated turbine inlet temperature, and computing means receiving as an input signal said temperature output signal for computing simulated turbine shaft horsepower, the computed horsepower value being utilizable as a factor determinative of the turbine r.p.m. as computed by said r.p.m. computing means.

3. In grounded aircraft training apparatus for simulating the operation of turbo-propeller aircraft including means for computing simulated turbine r.p.m., apparatus for simulating the turbine system of said aircraft comprising a simulated power lever, means providing a variable signal as a function of the position of said power lever, computing means receiving said signal as an input signal and providing an output signal representing simulated fuel flow, means for modifying said fuel flow signal in accordance with the turbine and r.p.m. as computed by said r.p.m. computing means, computing means receiving said modified signal as an input signal and providing an output signal representing simulated turbine inlet temperature, and computing means receiving as an input signal said temperature output signal for computing simulated turbine shaft horsepower, the computed horsepower value being utilizable as a factor determinative of the turbine r.p.m. as computed by said r.p.m. computing means.

4. In grounded aircraft training apparatus for simulating the operation of turbo-propeller aircraft including means for computing simulated turbine r.p.m., apparatus for simulating the turbine system of said aircraft comprising a simulated power lever, means providing a variable signal as a function of the position of said power lever, computing means receiving said signal as an input signal and providing an output signal representing simulated fuel flow, computing means receiving as an input signal said fuel flow output signal and in turn providing an output signal representing simulated turbine inlet temperature, means for modifying said temperature signal in accordance with the turbine r.p.m. computed by said r.p.m. computing means, and computing means receiving said modified temperature signal as an input signal for computing simulated turbine shaft horsepower, the computed horsepower value being utilizable as a factor determinative of the turbine r.p.m. as computed by said r.p.m. computing means.

5. In grounded aircraft training apparatus for simulating the operation of turbo-propeller aircraft including means for computing simulated turbine r.p.m., apparatus for simulating the turbine system of said aircraft comprising a simulated power lever, means providing a variable signal as a joint function of the position of said power lever and the turbine r.p.m. as computed by said r.p.m. computing means, computing means receiving said signal as an input signal and providing an output signal representing simulated fuel flow, means for modifying said fuel flow signal in accordance with the turbine and r.p.m. as computed by said r.p.m. computing means, computing means receiving said modified signal as an input signal and providing an output signal representing simulated turbine inlet temperature, means for modifying said temperature signal in accordance with the turbine r.p.m. computed by said r.p.m. computing means, and computing means receiving said modified temperature signal as an input signal for computing simulated turbine shaft horsepower, the computed horsepower value being utilizable as a factor determinative of the turbine r.p.m. as computed by said r.p.m. computing means.

6. In grounded aircraft training apparatus for simulating the operation of turbo-propeller aircraft including means for computing simulated turbine r.p.m. and means for computing a plurality of simulated ambient conditions determinative of the simulated flight including compressor inlet temperature: a computing system for simulating the turbine system of said aircraft comprising a simulated power lever, means for computing simulated fuel flow, means for computing simulated turbine inlet temperature as a function of said computed fuel flow and r.p.m., means for computing simulated shaft horsepower as a joint function of said computed turbine inlet temperature and r.p.m., the computed shaft horsepower being utilizable as a factor determinative of the turbine r.p.m as computed by said r.p.m. computing means, means controlling the computation of said fuel flow computing means for computing scheduled fuel flow in simulation of the operation of a fuel flow control, means providing an acceleration fuel flow control signal as a joint function of said computed compressor inlet temperature and r.p.m. and of the position of said power lever for said fuel flow control simulation means, said control signal being determinative of an acceleration fuel flow schedule, means providing a plurality of steady state fuel flow control signals that are functions of the position of said power lever and of said computed r.p.m. for said simulated fuel flow control means determinative of a steady state fuel flow schedule, and means responsive to attainment of a predetermined relation of said acceleration fuel flow control signal and said steady state fuel flow control signals for transferring control of said simulated fuel flow control means from said acceleration fuel flow control signal to said steady state fuel flow signals.

7. The combination as defined in claim 6 wherein the ambient condition computing means includes means for computing simulated sea level altitude and of simulated ram pressure ratio, further provided with means for applying an input signal that is a function of said computed altitude and ram pressure ratio to the shaft horsepower computing means.

8. The combination as specified in claim 6 with the addition of a torque computing means receiving an input signal from the shaft horsepower computing means, the computed torque being the factor determinative of the operation of the r.p.m. computing means.

9. The combination as defined in claim 6 with the addition of computing means simulating the effect of a fine fuel flow control and providing an additional control signal that is a function of the position of the power lever and the computed turbine inlet temperature, and means to apply said additional control signal to the fuel flow computing means, whereby said fuel flow computing means, turbine inlet temperature computing means and fine fuel flow control means interact with one another to cause said fine fuel flow control means ultimately to attain a stable condition.

10. The combination as defined in claim 6 with the inclusion of means for deriving a first control signal according to the position of said power lever, means for deriving a second control signal representative of the computed r.p.m., means for computing the difference of said control signals and for alternatively applying the resultant difference signal to the fuel flow control means when said second control signal exceeds said first control signal in magnitude and for disconnecting said difference signal from said fuel flow control means when said second control signal is less in magnitude than said first control signal, said difference signal when applied being of a sense so as to effect decrease of the computed fuel flow and ultimately of said computed r.p.m., whereby said computed fuel flow and computed r.p.m. are caused to oscillate about and ultimately to settle at a steady value with repeated alternate application and disconnection of the difference signal.

11. The combination as specified in claim 6 with the inclusion of means for deriving a further plurality of control signals that are functions of the computed r.p.m. and of the position of the power lever, and means responsive to placement of said power lever in a predetermined position and also responsive to a predetermined computed r.p.m. for transferring control of the aforesaid fuel flow control means from the aforesaid steady state fuel flow control signals to said further control signals.

12. A system as specified in claim 6 with the inclusion of a simulated flight control operable to effect run down of said system, and means responsive to said control to assure that said run down shall be direct and in avoidance of the steady state and acceleration schedules.

References Cited in the file of this patent

UNITED STATES PATENTS

| 2,731,737 | Stern | Jan. 24, 1956 |
| 2,798,308 | Stern | July 9, 1957 |
| 2,824,388 | Stern | Feb. 25, 1958 |

FOREIGN PATENTS

| 543,876 | Canada | July 23, 1957 |
| 766,184 | Great Britain | Jan. 16, 1957 |